US008643926B2

(12) United States Patent
Wakabayashi

(10) Patent No.: US 8,643,926 B2
(45) Date of Patent: Feb. 4, 2014

(54) IMAGE FORMING APPARATUS

(75) Inventor: Shuichi Wakabayashi, Okaya (JP)

(73) Assignee: Seiko Epson Corporation (JP)

( * ) Notice: Subject to any disclaimer, the term of this patent is extended or adjusted under 35 U.S.C. 154(b) by 349 days.

(21) Appl. No.: 13/105,199

(22) Filed: May 11, 2011

(65) Prior Publication Data
US 2011/0286050 A1   Nov. 24, 2011

(30) Foreign Application Priority Data

May 21, 2010 (JP) ................................. 2010-117044

(51) Int. Cl.
*G02B 26/08* (2006.01)
(52) U.S. Cl.
USPC ........................................ 359/224.1; 359/904
(58) Field of Classification Search
USPC .................................... 359/202.1, 224.1, 904
See application file for complete search history.

(56) References Cited

U.S. PATENT DOCUMENTS

| 7,492,495 | B2 | 2/2009 | Ishihara et al. |
| 2008/0297868 | A1* | 12/2008 | Mizumoto ................ 359/199 |
| 2011/0249312 | A1 | 10/2011 | Ishida et al. |
| 2011/0279879 | A1 | 11/2011 | Wakabayashi |

FOREIGN PATENT DOCUMENTS

JP        2007-199251      8/2007

* cited by examiner

*Primary Examiner* — Jennifer L. Doak
(74) *Attorney, Agent, or Firm* — Harness, Dickey & Pierce, P.L.C.

(57) ABSTRACT

There is provided an image forming apparatus that is configured so as to continuously display a plurality of images in a drawing area by scanning light for the drawing area formed on a display surface. The image forming apparatus includes a light emitting unit that emits the light, an optical scanning unit that two-dimensionally scans the light emitted from the light emitting unit for the drawing area, and a driving control unit that controls driving of the optical scanning unit such that the number of the images displayed in the drawing area in a unit of time is changed by changing a range in which the light is scanned on the drawing area at the time of displaying the images based on a shape and a size of each of the images, which are displayed in the drawing area, on the drawing area.

15 Claims, 13 Drawing Sheets

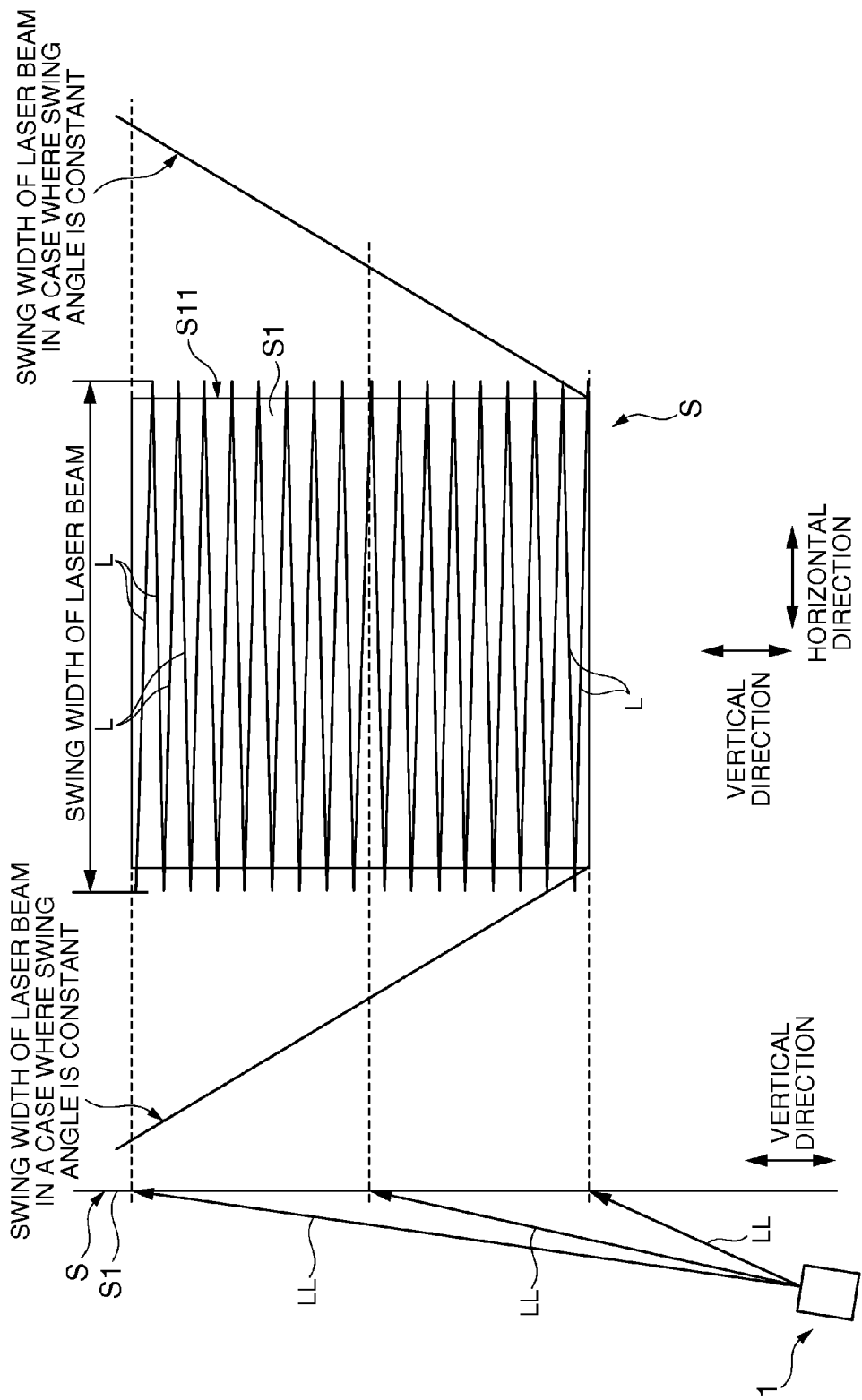

IMAGE FORMING APPARATUS

BACKGROUND

1. Technical Field

The present invention relates to an image forming apparatus.

For example, as image forming apparatuses that display images on a surface of a screen or the like, optical scanning-type projectors are widely known (for example, see JP-A-2007-199251).

2. Related Art

An optical scanning-type projector disclosed in JP-A-2007-199251 has a light source that emits laser beams of a desired color at a desired timing and a polarizing unit that two-dimensionally scans the laser beams emitted from the light source. In addition, the polarizing unit has a first optical scanner that scans laser beams in the horizontal direction and a second optical scanner that scans laser beams in the vertical direction. Each of these two optical scanners has a mirror that reflects the laser beams and is configured to scan the laser beams by turning the mirror around a predetermined axis. Such an optical scanning-type projector is configured so as to display a desired image on the screen by performing a two-dimensional scanning process in which laser beams are scanned by the first optical scanner, and then laser beams are scanned by the second optical scanner.

The optical scanning-type projector disclosed in JP-A-2007-199251 is driven such that the swing widths of the first and second optical scanners are maintained at set values for any image regardless of the size of the image displayed on the screen. Accordingly, for example, even in a case where the width of an image (hereinafter, also referred to as a "display image") displayed on the screen in the horizontal direction is far smaller than the swing width of the first optical scanner or the width of the image in the vertical direction is far smaller than the swing width of the second optical scanner, the first optical scanner and the second optical scanner need to be turned with a large swing width with respect to the display image.

According to such a driving method, the time interval required for displaying one image is unnecessarily lengthened. As a result, the number of images that can be displayed (drawn) per unit time is decreased. Consequently, there is a problem in that variations in the image displayed on the screen occur or a moving picture cannot be reproduced smoothly. Furthermore, there is a problem in that more power is consumed than necessary.

SUMMARY

An advantage of some aspects of the invention is that it provides an image forming apparatus capable of realizing superior drawing characteristics.

According to an aspect of the invention, there is provided an image forming apparatus that is configured so as to continuously display a plurality of images in a drawing area by scanning light for the drawing area formed on a display surface. The image forming apparatus includes: a light emitting unit that emits the light; an optical scanning unit that two-dimensionally scans the light emitted from the light emitting unit for the drawing area by scanning of the light in a first direction and scanning of the light in a second direction that is orthogonal to the first direction; and a driving control unit that controls driving of the optical scanning unit such that the number of the images displayed in the drawing area in a unit of time is changed by changing a range in which the light is scanned on the drawing area at the time of displaying the images based on a shape and a size of each of the images, which are displayed in the drawing area, on the drawing area.

According to the above-described image forming apparatus, the number of the images that can be drawn in a unit of time can be increased. Thus, for example, images of which variations are prevented or images in which a motion is smooth can be drawn. As a result, an image forming apparatus having superior drawing characteristics can be acquired.

It is preferable that the above-described image forming apparatus further includes a storage unit that stores image data of the plurality of images in the order in which the image data is displayed, wherein the driving control unit controls the driving of the optical scanning unit based on latest image data out of a plurality of sets of image data stored in the storage unit.

In such a case, an image forming apparatus having further superior drawing characteristic can be acquired.

In addition, in the above-described image forming apparatus, it is preferable that the driving control unit drives the optical scanning unit by allowing a swing width of the scanning on the drawing area in the second direction to be in correspondence with a maximum width of the images, which are displayed in the drawing area, on the drawing area in the second direction.

In such a case, the scanning in the second direction having an unnecessarily large swing width can be prevented, and accordingly, a time interval required for drawing one image can be shortened. Therefore, the number of images that can be drawn in a unit of time can be further increased.

In addition, in the above-described image forming apparatus, it is preferable that the driving control unit controls the driving of the optical scanning unit such that the swing width of the scanning on the drawing area in the second direction is the same as the maximum width of the images, which are displayed in the drawing area, on the drawing area in the second direction.

In such a case, a time interval required for drawing one image can be further shortened. Therefore, the number of images that can be drawn in a unit of time can be further increased.

In addition, in the above-described image forming apparatus, it is preferable that the driving control unit includes a second-direction maximum width detecting section that detects the maximum width of the images, which are displayed in the drawing area, on the drawing area in the second direction.

In such a case, the swing width of the sub scanning of laser beams on the drawing area can be changed more reliably in accordance with the maximum width of the images displayed in the drawing area in the second direction.

In addition, in the above-described image forming apparatus, it is preferable that image data of each of the images displayed in the drawing area includes data relating to a maximum width on the drawing area in the second direction, and the driving control unit controls the swing width of the scanning in the second direction based on the data.

In such a case, the maximum width of the images displayed in the drawing area in the second direction does not need to be acquired through a calculation operation or the like. Therefore, images can be displayed in the drawing area more smoothly and more accurately.

In addition, in the above-described image forming apparatus, it is preferable that the driving control unit drives the optical scanning unit by allowing a swing width of the scanning on the drawing area in the first direction to be in correspondence with the maximum width of the images, which are displayed in the drawing area, on the drawing area in the first direction.

In such a case, the scanning in the first direction having an unnecessarily large swing width can be prevented, and accordingly, power required for drawing one image can be reduced.

In addition, in the above-described image forming apparatus, it is preferable that the driving control unit controls the driving of the optical scanning unit such that the swing width of the scanning on the drawing area in the first direction is the same as the maximum width of the images, which are displayed in the drawing area, on the drawing area in the first direction.

In such a case, the power consumed for drawing one image can be further reduced. Accordingly, the power consumption per unit time can be further reduced.

In addition, in the above-described image forming apparatus, it is preferable that the driving control unit includes a first-direction maximum width detecting section that detects the maximum width of the images, which are displayed in the drawing area, on the drawing area in the first direction.

In such a case, the swing width of the scanning of laser beams on the drawing area in the first direction can be changed more reliably in accordance with the maximum width of the images displayed in the drawing area in the first direction.

In addition, in the above-described image forming apparatus, it is preferable that image data of the images displayed in the drawing area includes data relating to the maximum width on the drawing area in the first direction, and the driving control unit controls the swing width of the scanning in the first direction based on the data.

In such a case, the maximum width of the images displayed in the drawing area in the first direction does not need to be acquired through a calculation operation or the like. Therefore, images can be displayed in the drawing area more smoothly and more accurately.

In addition, in the above-described image forming apparatus, it is preferable that the optical scanning unit includes an optical scanner, in which a movable plate having a light reflecting unit reflecting the light emitted from the light emitting unit is disposed so as to be turnable in at least one direction or two orthogonal directions, scanning the light reflected by the light reflecting unit for the drawing area in accordance with the turning.

In such a case, the configuration of the optical scanning unit can be simplified.

In addition, in the above-described image forming apparatus, it is preferable that the driving control unit has a function for correcting distortion of the images displayed in the drawing area.

In such a case, a clear image having no distortion in the drawing area can be displayed.

BRIEF DESCRIPTION OF THE DRAWINGS

The invention will be described with reference to the accompanying drawings, wherein like numbers reference like elements.

FIGS. 4A and 4B are diagrams illustrating the operation of the image forming apparatus shown in FIG. 1 (FIG. 4A is a side view, and FIG. 4B is a front view).

DESCRIPTION OF EXEMPLARY EMBODIMENTS

Hereinafter, image forming apparatuses according to preferred embodiments of the invention will be described with reference to the accompanying drawings.

First Embodiment

Figure 1:
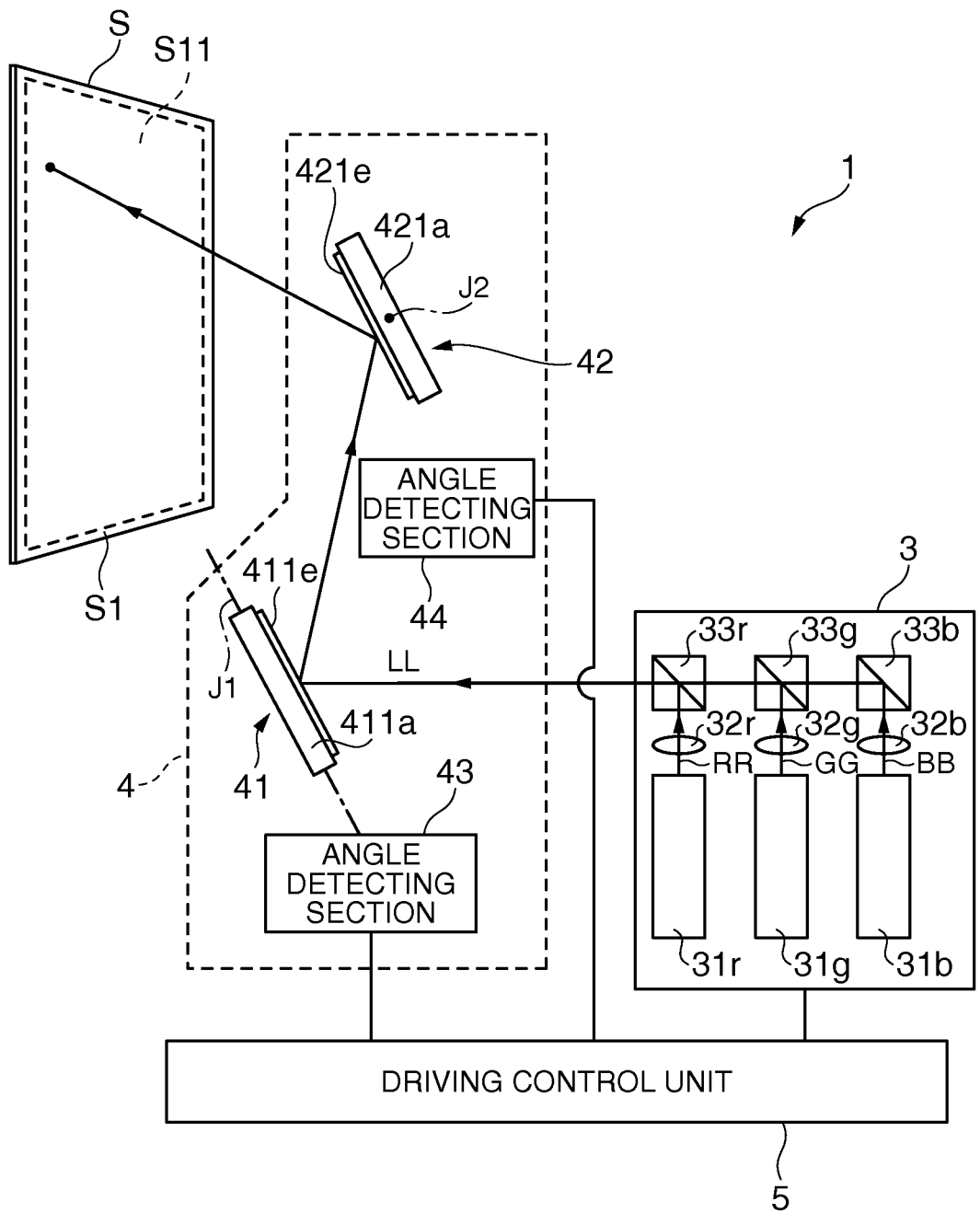
FIG. 1 is a configuration diagram showing an image forming apparatus according to a first embodiment of the invention.
Figure 2:
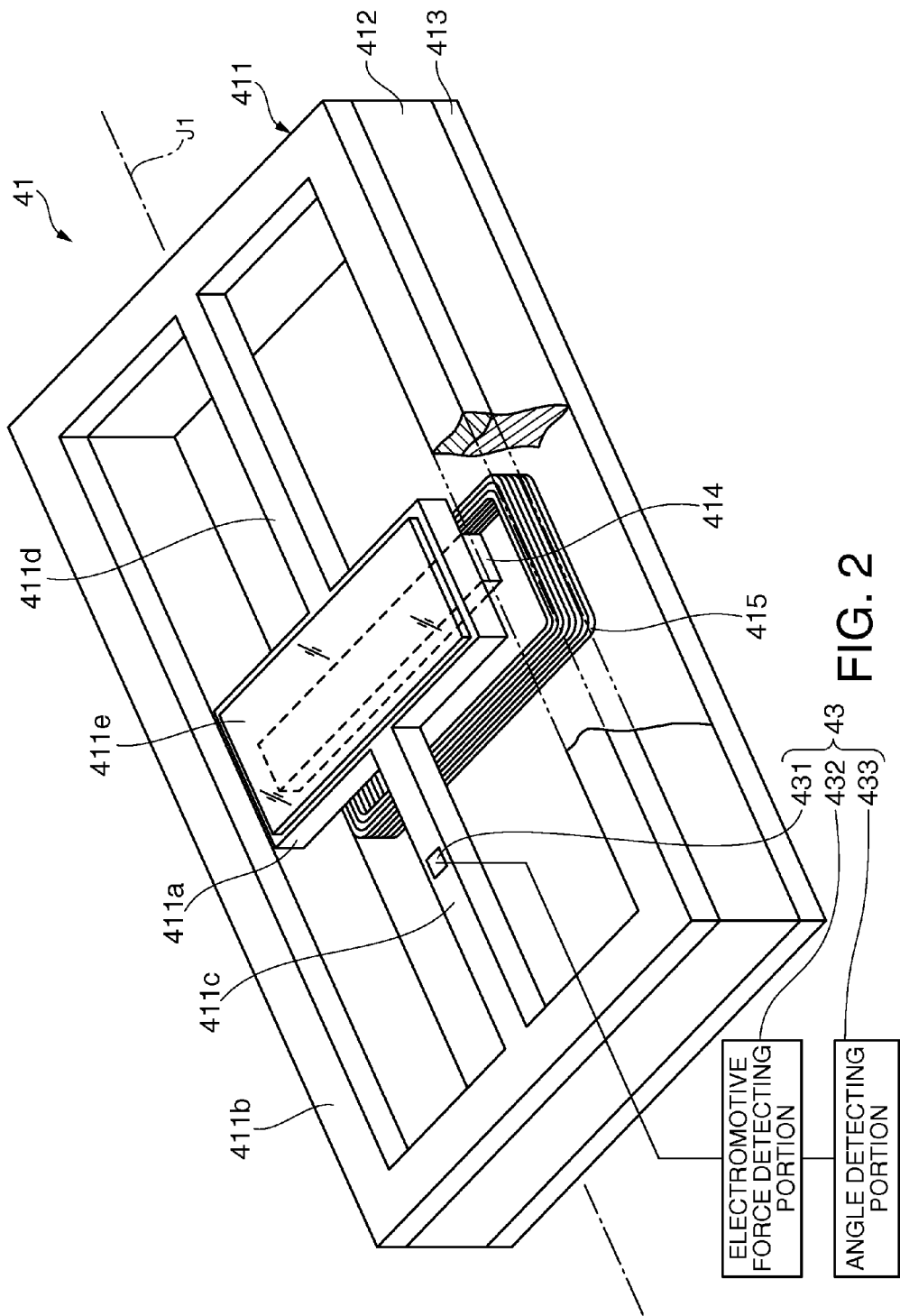
FIG. 2 is a partial sectional perspective view of an optical scanner that is included in the image forming apparatus shown in FIG. 1.
Figure 3A:
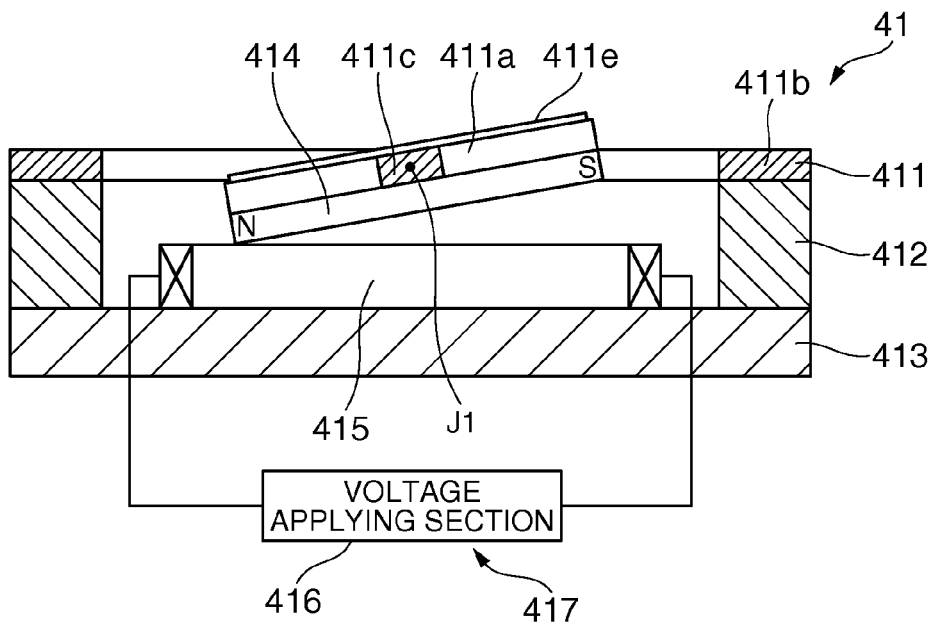
FIGS. 3A and 3B are cross-sectional views illustrating the driving of the optical scanner shown in FIG. 2.
Figure 3B:
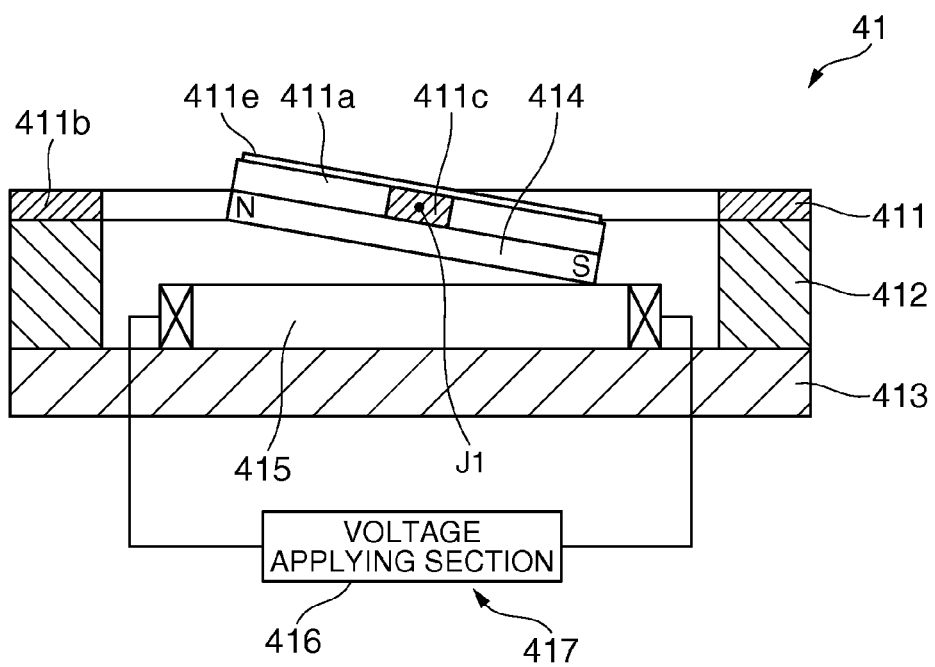
Figure 5A:
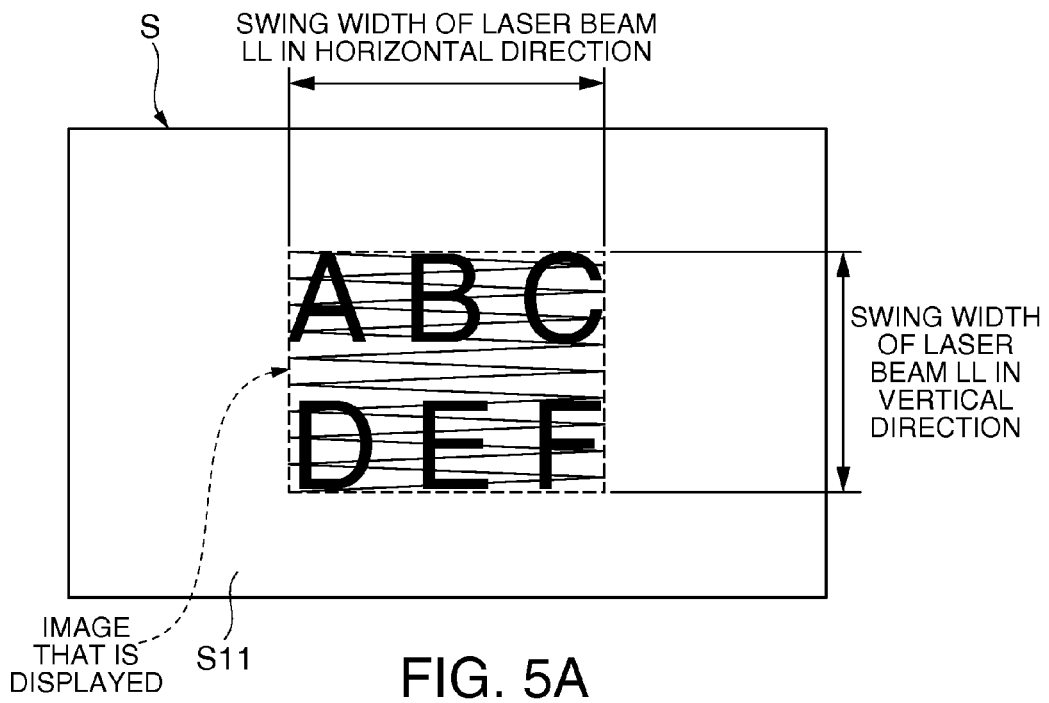
FIGS. 5A and 5B are plan views illustrating the operation of the image forming apparatus shown in FIG. 1.
Figure 5B:
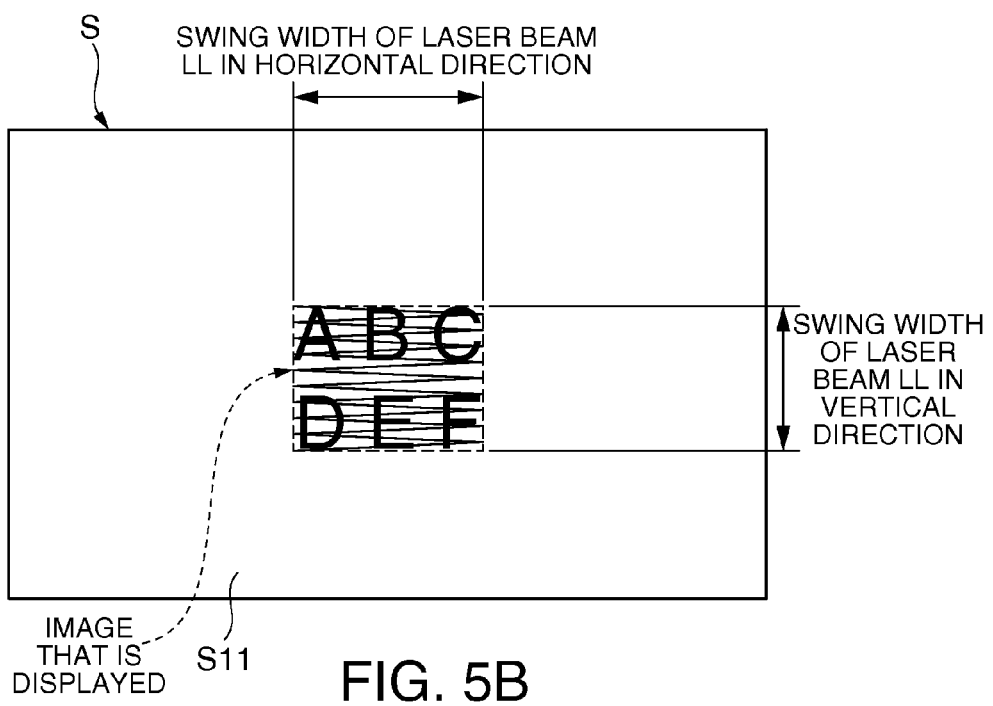
Figure 6:
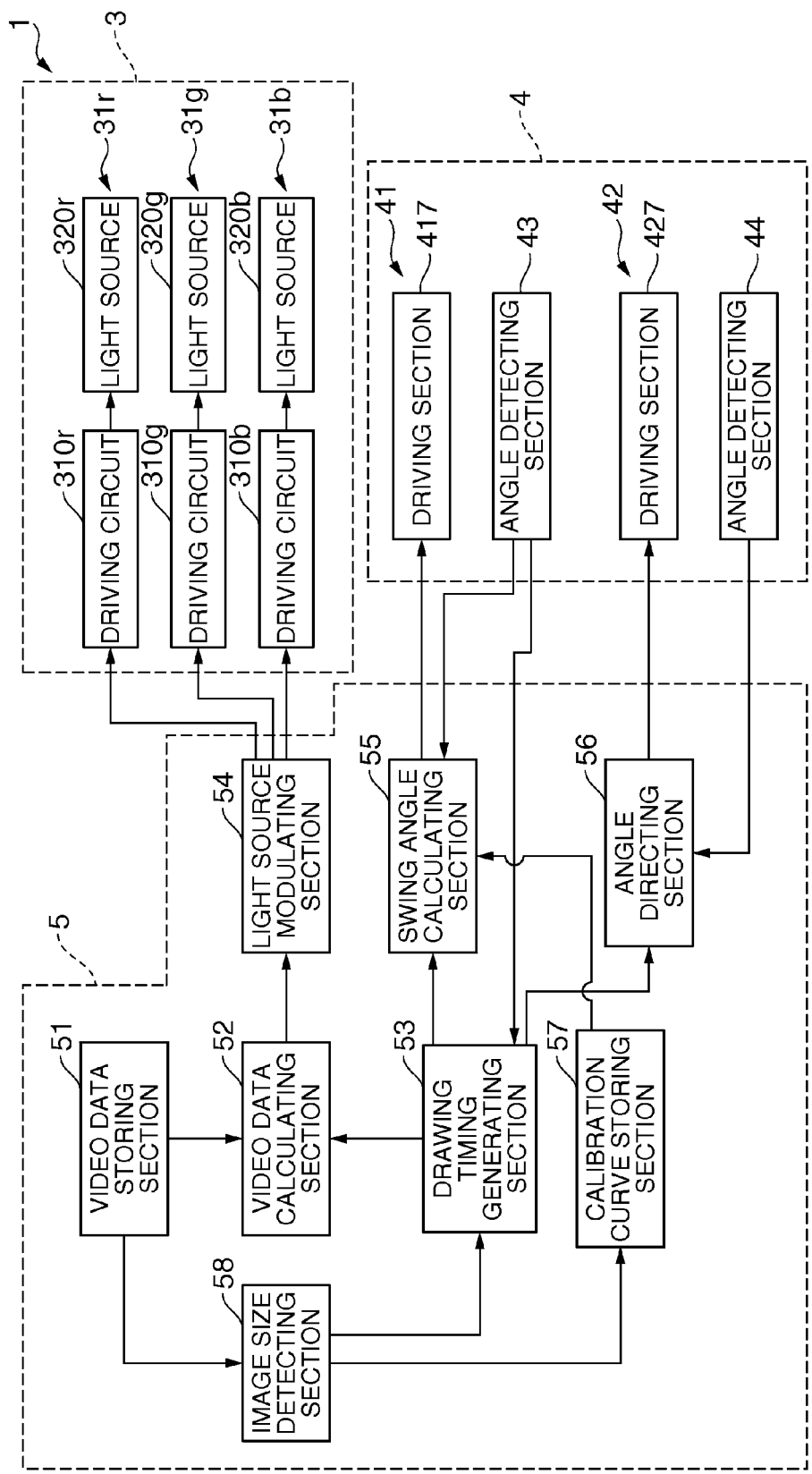
FIG. 6 is a block diagram showing a driving control unit, an optical scanning unit, and a light source unit shown in FIG. 1.
Figure 7:
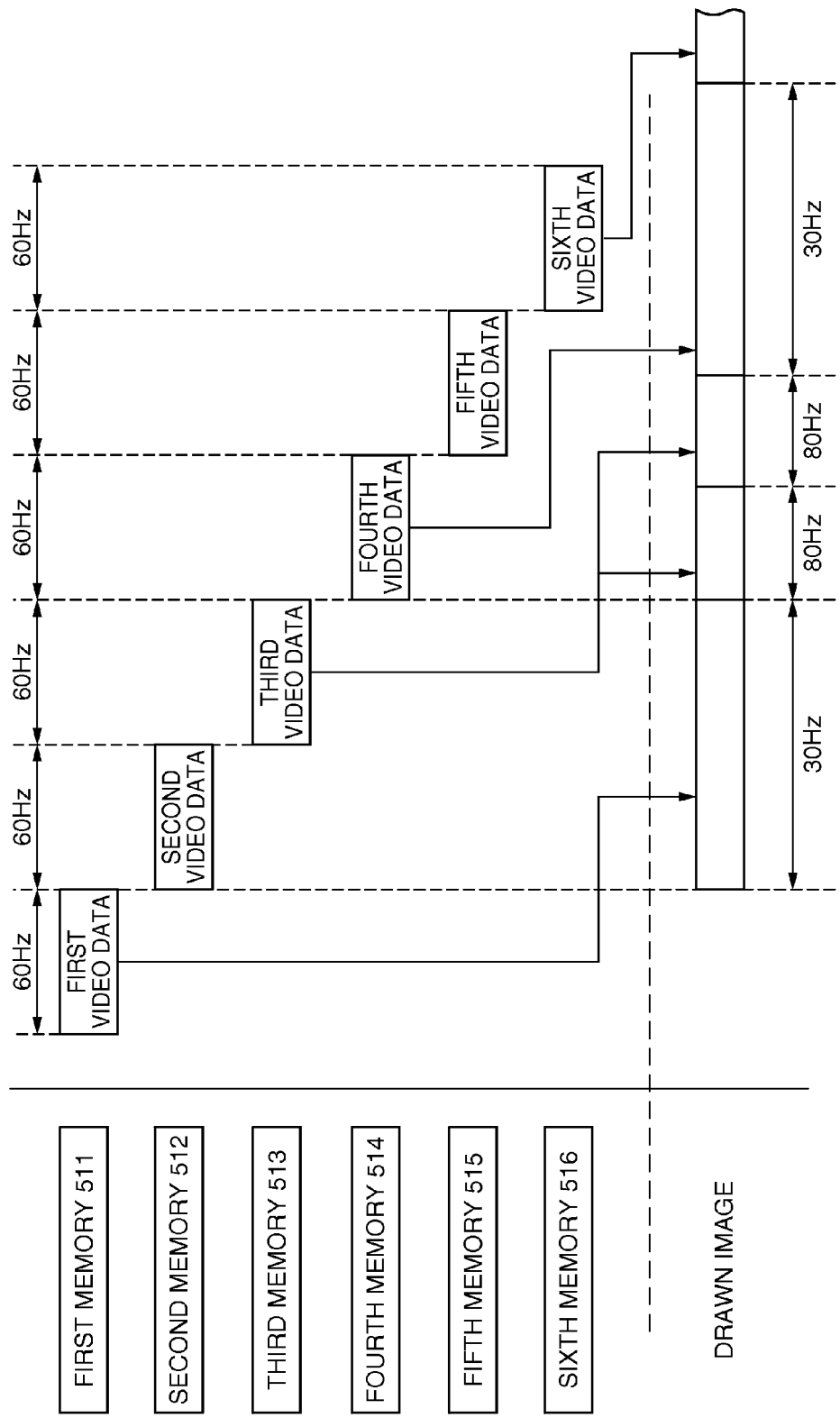
FIG. 7 is a diagram illustrating the operation of the image forming apparatus shown in FIG. 1 in detail.
Figure 8A:
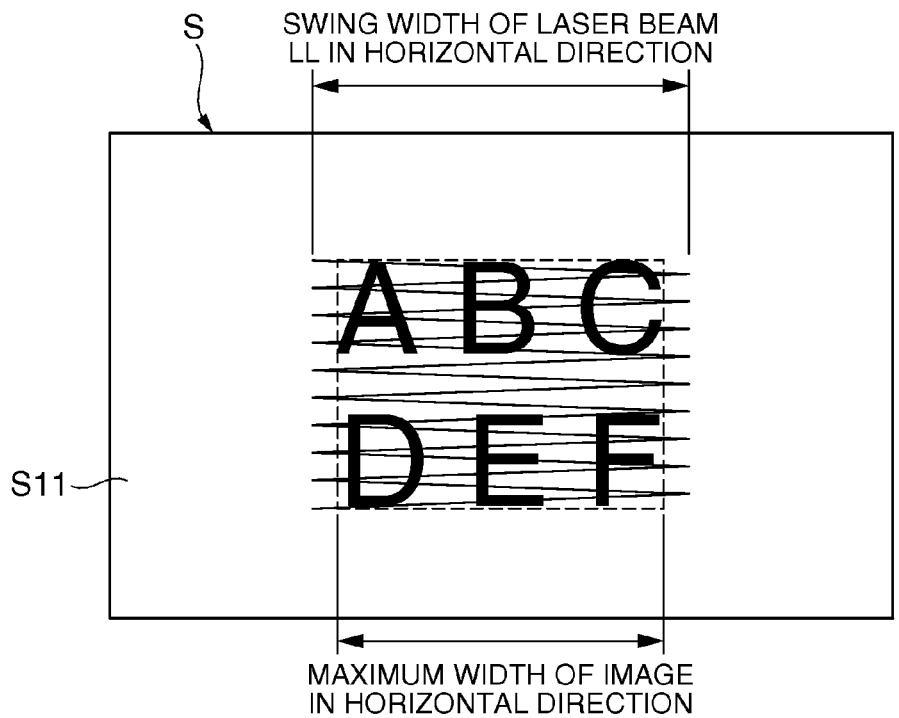
FIGS. 8A and 8B are plan views showing modified examples of the image forming apparatus shown in FIG. 1.
Figure 8B:
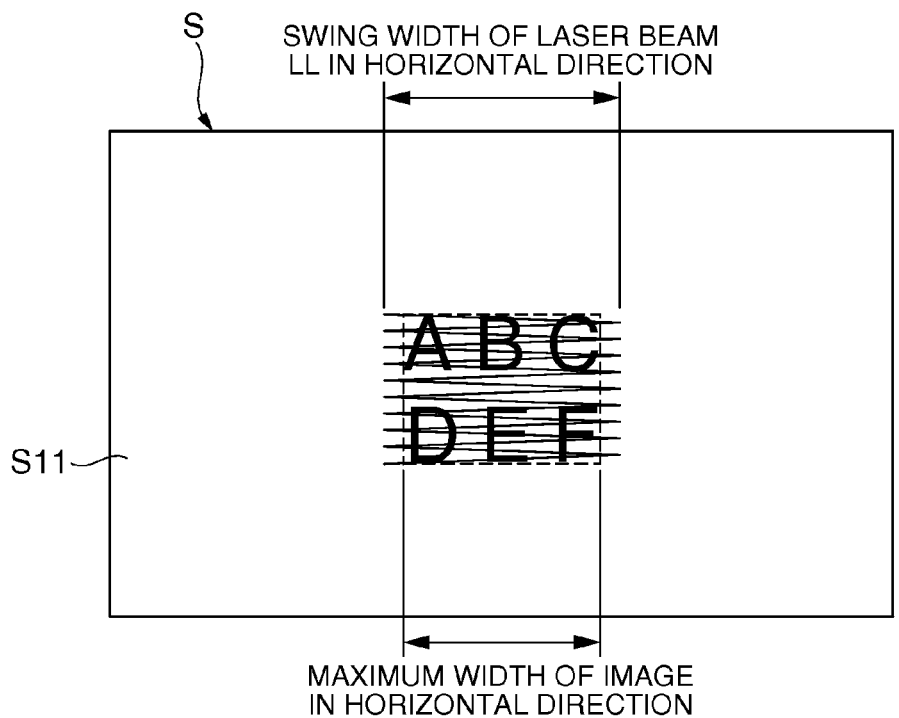

FIG. 1 is a configuration diagram showing an image forming apparatus according to a first embodiment of the invention. FIG. 2 is a partial sectional perspective view of an optical scanner that is included in the image forming apparatus shown in FIG. 1. FIGS. 3A and 3B are cross-sectional views illustrating the driving of the optical scanner shown in FIG. 2. FIGS. 4A and 4B are diagrams illustrating the operation of the image forming apparatus shown in FIG. 1 (FIG. 4A is a side view, and FIG. 4B is a front view). FIGS. 5A and 5B are plan views illustrating the operation of the image forming apparatus shown in FIG. 1. FIG. 6 is a block diagram showing a driving control unit, an optical scanning unit, and a light source unit shown in FIG. 1. FIG. 7 is a diagram illustrating the operation of the image forming apparatus shown in FIG. 1 in detail. FIGS. 8A and 8B are plan views showing modified examples of the image forming apparatus shown in FIG. 1. Hereinafter, for convenience of the description, the upper side, the lower side, the right side, and the left side in FIGS. 2 to 5B are referred to as "upper side", "lower side", "right side", and "left side".

The optical scanning-type projector (image forming apparatus) 1 shown in FIG. 1 is an apparatus that displays images such as still images or moving images that include a photograph, an illustration, a commercial, a promotional film, and the like, for example, on a drawing area S11 formed on a display surface S1 of a screen S. This optical scanning-type projector 1 includes a light source unit (light emitting unit) 3 that emits laser beams (light), an optical scanning unit 4 that scans the laser beams emitted from the light source unit 3 for the drawing area S11, and a driving control unit 5 that controls the driving of the optical scanning unit 4. Hereinafter, the constituent elements will be described one after another in detail.

Light Source Unit

The light source unit 3 includes: laser beam sources 31r, 31g, and 31b of each color; collimator lenses 32r, 32g, and 32b disposed in correspondence with the laser beam sources 31r, 31g, and 31b of each color; and dichroic mirrors 33r, 33g, and 33b.

In addition, as shown in FIG. 6, the laser beam sources 31r, 31g, and 31b of each color include driving circuits 310r, 310g, and 310b and a red light source 320r, a green light source 320g, and a blue light source 320b and, as shown in FIG. 1, emit laser beams RR, GG, and BB of the colors red, green, and blue. The laser beams RR, GG, and BB are emitted in states of being modulated in accordance with driving signals that are transmitted from the light source modulating section 54 of the driving control unit 5, which will be described later, and are parallelized by the collimator lenses 32r, 32g, and 32b that are collimator optical devices so as to be formed as thin beams.

The dichroic mirrors 33r, 33g, 33b have characteristics of reflecting the red laser beams RR, the green laser beams GG, and the blue laser beams BB and combine the laser beams RR, GG, and BB of each color so as to output one laser beam LL.

Instead of the collimator lenses 32r, 32g, and 32b, collimator mirrors can be used. Also in such a case, a thin beam having parallel light fluxes can be formed. In addition, in a case where the parallel light fluxes are emitted from the laser beam sources 31r, 31g, and 31b of each color, the collimator lenses 32r, 32g, and 32b may be omitted. Furthermore, the laser beam sources 31r, 31g, and 31b can be replaced with light sources such as light emitting diodes that generate the same light fluxes.

Here, the order of the laser beam sources 31r, 31g, and 31b of each color, the collimator lenses 32r, 32g, and 32b, and the dichroic mirrors 33r, 33g, and 33b shown in FIG. 1 is merely an example. Thus, the order may be freely set with the combination of each color (the laser beam source 31r, the collimator lens 32r, and the dichroic mirror 33r for the red color, the laser beam source 31g, the collimator lens 32g, and the dichroic mirror 33g for green, and the laser beam source 31b, the collimator lens 32b, and the dichroic mirror 33b for blue) being maintained. For example, a combination of colors blue, red, and green in the order of being closer to the optical scanning unit 4 may be employed.

Optical Scanning Unit

The optical scanning unit 4 two-dimensionally scans the laser beam LL emitted from the light source unit 3 for the drawing area S11 by scanning (horizontal scanning: main scanning) the laser beam in the horizontal direction (a first direction) and scanning (vertical scanning: sub scanning) the laser beam in the vertical direction (a second direction) at a speed that is lower than the scan speed in the horizontal direction.

The optical scanning unit 4 includes: an optical scanner 41 that scans the laser beam LL emitted from the light source unit 3 in the horizontal direction for the drawing area S11; an angle detecting section 43 (a behavior detecting unit) that detects the angle (behavior) of a movable plate 411a of the optical scanner 41 to be described later; an optical scanner 42 that scans the laser beam LL emitted from the light source unit 3 in the vertical direction for the drawing area S11; and an angle detecting section (a behavior detecting unit) 44 that detects the angle (behavior) of a movable plate 421a of the optical scanner 42 to be described later.

Here, the configurations of the optical scanners 41 and 42 will be described. However, since the configurations of the optical scanners 41 and 42 are the same, hereinafter, the configuration of the optical scanner 41 will be representatively described, and the description of the optical scanner 42 will be omitted.

As shown in FIG. 2, the optical scanner 41 is a so-called vibration system with one degree of freedom and includes a base body 411, an opposing substrate 413 disposed so as to oppose the lower face of the base body 411, and a spacer member 412 that is disposed between the base body 411 and the opposing substrate 413.

The base body 411 includes: the movable plate 411a; a support portion 411b that supports the movable plate 411a so as to be turnable; and one pair of connection portions 411c and 411d that connect the movable plate 411a and the support portion 411b together.

The movable plate 411a forms the shape of an approximate rectangle in the plan view. On the upper face of the movable plate 411a, a light reflecting unit (mirror) 411e that has optical reflectivity is disposed. The surface (the upper face) of the light reflecting unit 411e configures a reflective surface that reflects light. The light reflecting unit 411e, for example, is configured by a metal film formed from Al, Ni, or the like. In addition, on the lower face of the movable plate 411a, a permanent magnet 414 is disposed.

The support portion 411b is disposed so as to surround the outer circumference of the movable plate 411a in the plan view of the movable plate 411a. In other words, the support portion 411b forms a frame shape, and the movable plate 411a is located on the inside thereof.

The connection portion 411c connects the movable plate 411a and the support portion 411b on the left side of the movable plate 411a, and the connection portion 411d connects the movable plate 411a and the support portion 411b on the right side of the movable plate 411a.

Each of the connection portions 411c and 411d forms a long shape. In addition, the connection portions 411c and 411d can be elastically transformed. The one pair of the connection portions 411c and 411d is disposed along the same axis, and the movable plate 411a turns around the axis (hereinafter, referred to as a "turning center axis J1") with respect to the support portion 411b.

The base body 411, for example, is composed of silicon as its major material, and the movable plate 411a, the support portion 411b, and the connection portions 411c and 411d are integrally formed. By using silicon as its major material, the base body 411 can have superior turning characteristics and superior durability. In addition, fine processing can be performed, and the miniaturization of the optical scanner 41 can be achieved.

The spacer member 412 forms a frame shape, and the upper face is bonded to the lower face of the base body 411. In addition, the spacer member 412 has a shape that is approximately the same as the shape of the support portion 411b in the plan view of the movable plate 411a. The spacer member 412, for example, is composed of various types of glass, various ceramics, silicon, $SiO_2$, or the like.

The method of bonding the spacer member 412 and the base body 411 is not particularly limited. Thus, for example, the spacer member 412 and the base body 411 may be bonded together through an additional member such as an adhesive, and anodic bonding or the like may be used depending on the composition material of the spacer member 412.

The opposing substrate 413, similarly to the spacer member 412, is composed of, for example, various types of glass, silicon, SiO$_2$, or the like. In a portion of the upper face of the opposing substrate 413 that faces the movable plate 411a, a coil 415 is disposed.

The permanent magnet 414 forms a board rod shape and is disposed along the lower face of the movable plate 411a. The permanent magnet 414 is magnetized in a direction orthogonal to the turning center axis J1 in the plan view of the movable plate 411a. In other words, the permanent magnet 414 is disposed such that a segment joining both poles (the S pole and the N pole) is orthogonal to the turning center axis J1.

The permanent magnet 414 is not particularly limited, and, for example, a neodymium magnet, a ferrite magnet, a samarium-cobalt magnet, an alnico magnet, or the like may be used.

The coil 415 is disposed so as to surround the outer circumference of the permanent magnet 414 in the plan view of the movable plate 411a.

In addition, the optical scanner 41 includes a voltage applying section 416 that applies a voltage to the coil 415. The voltage applying section 416 is configured so as to be able to adjust (change) the conditions such as the value, the frequency, and the like of the applied voltage. The voltage applying section 416, the coil 415, and the permanent magnet 414 configure a driving section 417 that turns the movable plate 411a.

A predetermined voltage is applied to the coil 415 by the voltage applying section 416 under the control of the driving control unit 5, and a predetermined current flows through the coil 415. For example, when an alternating voltage is applied to the coil 415 by the voltage applying section 416 under the control of the driving control unit 5, a current flows in accordance with the applied voltage so as to generate a magnetic field in the thickness direction of the movable plate 411a, and the direction of the magnetic field is periodically changed. In other words, switching is alternately performed between a state A in which the upper side of the coil 415 is S pole, and the lower side thereof is the N pole and a state B in which the upper side of the coil 415 is the N pole, and the lower side thereof is the S pole.

In the state A, as shown in FIG. 3A, the right side of the permanent magnet 414 is displaced to the upper side in accordance with a repulsive force with respect to a magnetic field that is generated based on the conduction of the coil 415, and the left side of the permanent magnet 414 is displaced to the lower side in accordance with the attractive force of the magnetic field. Accordingly, the movable plate 411a turns in the counter clockwise direction so as to be tilted. In contrast, in the state B, as shown in FIG. 3B, the right side of the permanent magnet 414 is displaced to the lower side, and the left side of the permanent magnet 414 is displaced to the upper side. Accordingly, the movable plate 411a turns in the clockwise direction so as to be tilted. By alternately repeating the state A and the state B, the movable plate 411a turns around the turning center axis J1 while transforming the connection portions 411c and 411d in a torsional manner.

In addition, by adjusting the voltage applied to the coil 415 by the voltage applying section 416 under the control of the driving control unit 5, a current flowing therein can be adjusted. Accordingly, the swing angle (the swing width) with respect to the turning center axis J1 of the movable plate 411a (the reflection surface of a light reflecting unit 411e as its center can be adjusted.

The configuration of the optical scanner 41 is not particularly limited as long as the movable plate 411a can be turned therein. Thus, for example, as the driving method, instead of the electromagnetic driving using the coil 415 and the permanent magnet 414, for example, piezoelectric driving using a piezoelectric device or electrostatic driving using an electrostatic attractive force may be used.

As shown in FIG. 1, the optical scanners 41 and 42 having the above-described configuration are disposed such that the turning center axes J1 and J2 thereof are orthogonal to each other. By disposing the optical scanners 41 and 42 as above, the laser beam LL emitted from the light source unit 3 can be two-dimensionally scanned for the drawing area S11. Accordingly, a two-dimensional image can be drawn in the drawing area S11 by employing a relatively simple configuration.

To be more specific, the laser beam LL emitted from the light source unit 3 is reflected from the reflection surface of the light reflecting unit 411e of the optical scanner 41, then is reflected from the reflection surface of the light reflecting unit 421e of the optical scanner 42, and is projected in the drawing area S11 of the screen S. Then, by turning the light reflecting unit 411e of the optical scanner 41 and turning the light reflecting unit 421e of the optical scanner 42 at the angular velocity lower than the angular velocity (speed) of the light reflecting unit 411e, the laser beam LL emitted from the light source unit 3 is, for the drawing area S11, scanned in the horizontal direction and is scanned in the vertical direction at a scanning speed lower than the scanning speed of the horizontal direction. Accordingly, the laser beam LL emitted from the light source unit 3 is two-dimensionally scanned for the drawing area S11, and whereby an image is drawn in the drawing area S11.

Here, in order to turn the light reflecting unit 421e of the optical scanner 42 at the angular velocity lower than that of the light reflecting unit 411e of the optical scanner 41, for example, it is preferable that resonant driving using resonance is performed for the optical scanner 41, and a non-resonant driving not using resonance is performed for the optical scanner 42.

Alternatively, the laser beam LL emitted from the light source unit 3 may be reflected from the light receiving unit 421e of the optical scanner 42, first, and then be reflected from the light receiving unit 411e of the optical scanner 41. In other words, it may be configured such that the vertical scanning is performed first, and next, the horizontal scanning is performed.

Next, the angle detecting section 43 that detects the angle of the movable plate 411a of the optical scanner 41 will be described. Here, since the configuration of the angle detecting section 44 that detects the angle of the movable plate 421a of the optical scanner 42 is the same as that of the angle detecting section 43, the description thereof is omitted.

As shown in FIG. 2, the angle detecting section 43 includes: a piezoelectric device 431 that is disposed on the connection portion 411c of the optical scanner 41; an electromotive force detecting portion 432 that detects an electromotive force generated from the piezoelectric device 431; and an angle detecting portion 433 that acquires the angle of the movable plate 411a based on a detection result of the electromotive force detecting portion 432.

When the connection portion 411c is torsionally transformed in accordance with the turning of the movable plate 411a, the piezoelectric device 431 is transformed in accordance with the transformation of the connection portion 411c. When being transformed from a natural state of not having any external force applied to it, the piezoelectric device 431 has characteristics of generating an electromotive force having a magnitude corresponding to the amount of the transformation. Accordingly, the angle detecting portion 433 acquires the degree of torsion of the connection portion 411c based on the magnitude of the electromotive force detected by the electromotive force detecting portion 432 and acquires the angle of the movable plate 411*a* based on the degree of the torsion. In addition, the angle detecting portion 433 acquires the swing angle with respect to the turning center axis J1 of the movable plate 411*a* as its center. A signal that includes information of the angle and the swing angle of the movable plate 411*a* is transmitted from the angle detecting portion 433 to the driving control unit 5.

In addition, the angle of the movable plate 411*a* that is detected as described above may be set as an angle when a specific state of the optical scanner 41 is used as a reference (an angle of zero degrees). For example, the angle may be set as an angle when the initial state (a state in which a voltage is not applied to the coil 415) of the optical scanner 41 is used as a reference (an angle of zero degrees).

In addition, the detection of the angle of the above-described movable plate 411*a* may be continuously performed in real time or be performed intermittently. The angle detecting section 43 is not limited to the type that uses a piezoelectric device as in this embodiment, as long as it can detect the angle of the movable plate 411*a*. For example, the angle of the movable plate 411*a* may be detected by arranging a light receiving device such as a photo diode and a laser beam emitting unit emitting a laser beam toward the light receiving device such that the laser beam is blocked by the movable plate 411*a* when the movable plate 411*a* is at a predetermined angle and detecting the timing when the laser beam is blocked.

Driving Control Unit 5

Next, the driving control unit 5 will be described.

According to the optical scanning-type projector 1, when an image is drawn in the drawing area S11 by using one pair of optical scanners 41 and 42 as described above, a distortion due to a difference in optical paths up to the drawing area S11, for example, a distortion called a "trapezoidal distortion", in which the lengths in the lateral direction (the horizontal direction) are different on the upper and lower sides of an image displayed in the drawing area S11, occurs. The driving control unit 5 has a function for correction of such an image distortion.

To be more specific, in a case where the swing angle of the movable plate 411*a* of the optical scanner 41 is constant, the swing width of the laser beam LL in the light emitting state, in which the laser beam LL is emitted from the light source unit 3, changes in accordance with the angle of the movable plate 421*a* of the optical scanner 42 so as to increase as the position in vertical direction on the drawing area S11, for which the laser beam LL is scanned, is located farther from the optical scanning-type projector 1. Thus, according to the optical scanning-type projector 1, by decreasing the swing angle of the movable plate 411*a* by using the driving control unit 5 as the position on the drawing area S11, for which the laser beam LL is scanned, in the vertical direction is located farther from the optical scanning-type projector 1, the swing width of the laser beam LL in the light emitting state is constant along the vertical direction. The distortion of an image as described above can be prevented by the control operation of the driving control unit 5.

Here, the above-described swing width is a distance (gap) in the horizontal direction, in the light emitting state, between the position of the laser beam LL on a plane that is the same as the drawing area S11 when the movable plate 411*a* turns up to the maximum angle in a predetermined direction and the position of the laser beam LL on the same plane as the drawing area S11 when the movable plate 411*a* thereafter turns up to the maximum angle in the direction opposite to the above-described predetermined direction. In other words, as shown in FIGS. 4A and 4B, the swing width is the length of each of a plurality of drawing lines L that are trajectories of the laser beam LL on the drawing area S11 when the laser beam LL is two-dimensionally scanned on the drawing area S11 in the light emitting state.

In addition, in the optical scanning-type projector 1, it is preferable that the angle and the angular velocity of the movable plate 421*a* are controlled by the driving control unit 5 such that, in the drawing area S11, each gap in the vertical direction between adjacent drawing lines L that are odd drawing lines L from the upper side is constant, and each gap in the vertical direction between adjacent drawing lines L that are even drawing lines L from the upper side is constant. In such a case, distortion of an image in the vertical direction can be prevented.

In this embodiment, for example, the angle of the movable plate 421*a* is adjusted such that each gap between the drawing lines L that are adjacent to each other, in the vertical direction is constant in the left end portion and the right end portion of the drawing area S11 at the time of starting to draw the drawing lines L, and the angular velocity of the movable plate 421*a* is set to a predetermined value. In other words, the angle of the movable plate 421*a* is adjusted such that each gap between drawing start points, which are adjacent to each other, in the vertical direction is constant for the drawing lines L, and the angular velocity of the movable plate 421*a* is set to a constant value for the drawing lines L. In addition, the angular velocity of the movable plate 421*a* is set to a smaller value as the position of the drawing line L in the vertical direction is located farther from the optical scanning-type projector 1. Accordingly, the distortion of an image in the vertical direction can be prevented through a relatively simple control operation of the driving control unit 5, whereby a clear image can be displayed.

In addition, the driving control unit 5 is configured so as to control to change the swing width of the laser beam LL on the drawing area S11 in the horizontal direction in accordance with the maximum width of an image, which is displayed in the drawing area S11, in the horizontal direction and change the swing width of the laser beam LL on the drawing area S11 in the vertical direction in accordance with the maximum width of the image, which is displayed in the drawing area S11, in the vertical direction, in addition to the control operation of correcting the above-described distortion. Hereinafter, this will be described in detail.

For example, in a case where a predetermined image is drawn in the drawing area S11 by the optical scanning-type projector 1 as shown in FIGS. 5A and 5B, the driving control unit 5 controls the angle of the movable plate 411*a* of the optical scanner 41 such that the swing width of the laser beam LL in the horizontal direction in the light emitting state is the same as the maximum width of the image displayed in the drawing area S11 in the horizontal direction. Together with such control, the driving control unit 5 controls the angle of the movable plate 421*a* of the optical scanner 42 such that the swing width of the laser beam LL in the vertical direction in the light emitting state is the same as the maximum width of the image displayed in the drawing area S11 in the vertical direction, and the gap of the laser beams LL on the screen S (the drawing area S11) in the vertical direction is not changed.

By performing such control using the driving control unit 5, the turning angles of the movable plates 411*a* and 421*a* of the optical scanners 41 and 42 can be set to the minimum angle required for drawing an image, and accordingly, power is not consumed unnecessarily. Therefore, the power consumption of the optical scanning-type projector 1 can be reduced. In addition, the number of horizontal scans is decreased, and accordingly, the time required for displaying one image (one frame) can be shortened, and whereby the number of images that can be drawn per unit time is increased. Accordingly, even when the output level of the laser beams LL is set to be low, an image having the same brightness as a general case can be displayed in the drawing area S11, and, from this viewpoint, the power consumption of the optical scanning-type projector 1 can be saved. In addition, in a case where the number of images that can be drawn per unit time is increased, particularly when a moving picture or the like is displayed, an image in which the motion is smooth can be displayed.

In addition, in a case where two images having the same maximum width in the horizontal direction and different maximum widths in the vertical direction are compared, an image having a larger width in the vertical direction needs more time to be drawn.

Hereinafter, the configuration of the driving control unit 5 for realizing the above-described control operation will be described.

As shown in FIG. 6, the driving control unit 5 includes a video data storing (storage unit) section 51 that stores video data (image data) therein, a video data calculating section 52, a drawing timing generating section 53, a light source modulating section 54, a swing angle calculating section 55, an angle directing section 56, a calibration curve storing section 57, and an image size detecting section 58 (a first-direction maximum width detecting section and a second-direction maximum width detecting section).

The video data storing section 51 temporarily stores video data that is input from an external device such as a computer therein.

The image size detecting section 58 detects the maximum width of an image in the horizontal direction and the maximum width of the image in the vertical direction in a case where the image corresponding to the video data stored in the video data storing section is displayed in the drawing area S11. Accordingly, more reliably, the swing width of the laser beams LL on the drawing area S11 in the horizontal direction can be changed in accordance with the maximum width of the image displayed in the drawing area S11 in the horizontal direction, and the swing width of the laser beams LL on the drawing area S11 in the vertical direction can be changed in accordance with the maximum width of the image displayed in the drawing area S11 in the vertical direction.

A method of detecting the maximum widths in each direction is not particularly limited. For example, at least information indicating whether or not the laser beam LL is emitted to each portion (each pixel that is virtually set) of the drawing area S11 is stored in the video data that is stored in the video data storing section 51. The maximum width of the image represented in the drawing area S11 in the horizontal direction can be acquired by acquiring a pixel, which is located on the leftmost side, and a pixel, which is located on the rightmost side, out of the pixels emitting the laser beams LL based on this information, calculating distances between the two pixels and a pixel corresponding to the center of vibration (turning of the movable plate 411a) in vertical direction, and selecting the pixel that is located farther out of the two pixels. Similarly, the maximum width of the image displayed in the drawing area S11 in the vertical direction can be acquired by acquiring a pixel, which is located on the lowermost side, and a pixel, which is located on the uppermost side, out of the pixels emitting the laser beams LL based on the video data and calculating the distance between the two pixels in the vertical direction.

In addition, in a case where data relating to the maximum widths of an image in the horizontal and vertical directions in the case of displaying the image in the drawing area S11 is included in the video data that is stored in the video data storing section 51 in advance, the data can be used. In the case where the data relating to the maximum widths is included in the video data in advance, the image size detecting section 58 may not acquire the maximum widths of an image in the two directions by using the above-described method. Accordingly, the image can be displayed in the drawing area S11 more smoothly.

The drawing timing generating section 53 generates drawing timing information and drawing line information. In the drawing timing information, information of the timing when the drawing is performed and the like are included. In addition, in the drawing line information, information of the position of the drawing line L (the angle of the movable plate 421a) to be drawn in the vertical direction and the like are included. In addition, the position of a specific portion of the drawing line L may be set as the position of the drawing line L in the vertical direction, and examples of the specific portion include a tip end located on the left side, a tip end located on the right side, and the center.

The video data calculating section 52 reads out video data corresponding to the pixel to be drawn from the video data storing section 51 based on the drawing timing information that is input from the drawing timing generating section 53, performs various correction calculation operations and the like, and then transmits luminance data of each color to the light source modulating section 54.

The light source modulating section 54 modulates the light sources 320r, 320g, and 320b through the driving circuits 310r, 310g, and 310b based on the luminance data of each color that is input from the video data calculating section 52. In other words, the light source modulating section 54 performs turning the light sources 320r, 320g, and 320b on or off, adjusting (increasing or decreasing) the outputs of the light sources, and the like.

In the calibration curve storing section 57, a calibration curve such as a table, a calculation equation (function), that represents the relationship between the position of the laser beam LL (the position of the drawing line L in the vertical direction) that is scanned for the drawing area S11 on the drawing area S11 in the vertical direction at which the swing width of the laser beam LL is constant in the light emitting state and the swing angle of the movable plate 411a is memorized (stored). When an image is drawn, a target value of the swing angle is acquired based on the position of the laser beam LL, which is scanned for the drawing area S11, on the drawing area S11 in the vertical direction using the calibration curve and data relating to the maximum width of the image in the horizontal direction that is detected by the image size detecting section 58 and the positions of two pixels located in both ends. In addition, the calibration curve can be acquired through calculation and is stored in the calibration curve storing section 57 in advance.

Next, the operation of the optical scanning-type projector 1 at a time when an image is drawn on the drawing area S11 of the screen S will be described.

First, video data is input to the optical scanning-type projector 1. The input video data is temporarily stored in the video data storing section 51 and is read out from the video data storing section 51, and an image is drawn by using the video data. In such a case, the drawing of an image may be started after all the video data is stored in the video data storing section 51. Alternatively, it may be configured such that the drawing of an image is started after a part of the video data is stored in the video data storing section 51, and consecutive video data is stored in the video data storing section 51 in parallel with the drawing of an image.

In the case where the drawing of an image is started after a part of the video data is stored in the video data storing section 51, first, the video data corresponding to at least one frame, and, more preferably, two or more (for example, two frames) is stored in the video data storing section 51, and then, the drawing of an image is started. The reason for this is that, in a raster scan module, an image is drawn by performing horizontal scanning in a forward path and a returning path of the vertical scanning (hereinafter, also briefly referred to as "reciprocal drawing in the vertical direction"), and accordingly, the order of reading the video data from the video data storing section 51 is opposite when the image is drawn in the forward path of the vertical scanning and when the image is drawn in the returning path of the vertical scanning, which will be described below. Thus, in order to read out the video data from the opposite side when the drawing of an image is started in the returning path of the vertical scanning, video data corresponding to at least one frame that is used for drawing the image in the returning path needs to be stored in the video data storing section 51.

The image size detecting section 58 detects the maximum width in the horizontal direction and the maximum width in the vertical direction in a case where an image corresponding to the video data stored in the video data storing section 51 is displayed in the drawing area S11.

In addition, the drawing timing generating section 53 generates drawing timing information and drawing line information. The drawing timing information is transmitted to the video data calculating section 52, and the drawing line information is transmitted to the swing angle calculating section 55.

The video data calculating section 52 reads out video data corresponding to a pixel to be drawn from the video data storing section 51 based on the drawing timing information input from the drawing timing generating section 53, performs various correction calculation operations and the like for the read video data, and transmits luminance data of each color to the light source modulating section 54.

The light source modulating section 54 modulates the light sources 320$r$, 320$g$, and 320$b$ through the driving circuits 310$r$, 310$g$, and 310$b$ based on the luminance data of each color that is input from the video data calculating section 52. In other words, the light source modulating section 54 performs turning the light sources 320$r$, 320$g$, and 320$b$ on or off, adjusting (increasing or decreasing) the outputs of the light sources, and the like.

The angle detecting section 43 located on the optical scanner 41 side detects the angle and the swing angle of the movable plate 411$a$ and transmits information of the angle and the swing angle (the angle information of the movable plate 411$a$) to the drawing timing generating section 53 and the swing angle calculating section 55. In addition, the angle detection section 44 located on the optical scanner 42 side detects the angle of the movable plate 421$a$ and transmits the information of the angle (angle information of the movable plate 421$a$) to the angle directing section 56.

When the drawing of the current drawing line L is completed, and the information of the swing angle of the movable plate 411$a$ is input from the angle detecting section 43, the drawing timing generating section 53 transmits target angle information that represents a target angle of the movable plate 421$a$ at a time when the laser beam LL is emitted to the drawing start point of the drawing line L for which drawing is performed next time to the angle directing section 56 in synchronization with the input of the information of the swing angle. The target angle of the movable plate 421$a$ is set such that a gap between adjacent drawing start points in the vertical direction is constant. In addition, the target angle of the movable plate 421$a$ is set so as to be the same as the maximum width of an image in the vertical direction in a case where the image is displayed in the drawing area S11, which is detected by the image size detecting section 58. The angle directing section 56 compares the angle of the movable plate 421$a$ that is detected by the angle detecting section 44 and the target angle of the movable plate 421$a$, performs correction for the detected angle of the movable plate 421$a$ so as to allow the difference thereof to be zero, and transmits driving data to the driving section 427 of the optical scanner 42.

The driving section 427 drives the optical scanner 42 based on the driving data (applies a voltage to the coil). Accordingly, when the laser beam LL is emitted to the drawing start point, the angle of the movable plate 421$a$ becomes the target angle.

In addition, in this embodiment, for each drawing line L, the angular velocity of the movable plate 421$a$ may be set to be constant from the drawing start point to the drawing end point so as to allow the scanning speed of the laser beam LL in the vertical direction to be constant. Alternatively, the scanning speed of the laser beam LL in the vertical direction may be slowly changed by slowly changing the angular velocity of the movable plate 421$a$.

In addition, the drawing timing generating section 53 transmits drawing line information, that is, information of the position of the drawing line L to be drawn next in the vertical direction to the swing angle calculating section 55.

The swing angle calculating section 55 acquires the target swing angle of the movable plate 411$a$ at the drawing line L to be drawn next based on the information of the position of the drawing line L to be drawn next in the vertical direction, which is input from the drawing timing generating section 53, using the information (the target value of the swing angle of the movable plate 411$a$ corresponding to each drawing line L) read out from the calibration curve storing section 57. Then, the swing angle calculating section 55 transmits the driving data to the driving section 417 of the optical scanner 41 based on the information of the swing angle of the movable plate 411$a$ that is input from the angle detecting section 43 and the target swing angle of the movable plate 411$a$, so that the swing angle of the movable plate 411$a$ becomes the target swing angle.

The driving section 417 supplies energy to the optical scanner 41 or, conversely, takes energy away from the optical scanner 41 by enabling a current to flow through the coil 415 so as to generate a predetermined magnetic field by applying an effective voltage having a frequency that is the same as the resonance frequency of the optical scanner 41 to the coil 415 based on the driving data and changing the magnitude of the effective current and a phase difference between the optical scanner 41 and the driving waveform. Accordingly, the swing angle of the movable plate 411$a$ that is moved in resonance becomes the target swing angle. An image is drawn by sequentially scanning the laser beam LL for necessary portions on each drawing line L located in the drawing area S11 while adjusting the swing angle of the movable plate 411$a$ such that the swing angle of the movable plate 411$a$ becomes the target swing angle based on the information of the swing angle of the movable plate 411$a$ (the result of the detection), which is detected by the angle detecting section 43, and the target swing angle (a target value).

In addition, the drawing timing generating section 53 manages whether a frame to be drawn is an odd frame or an even frame and determines the turning direction (movement direction) of the movable plate 421a and the order of reading the video data from the video data storing section 51. In other words, the order of reading the video data is opposite in drawing an image in an odd frame (a forward path for the scanning in the vertical direction) and in drawing an image in an even frame (a returning path for the scanning in the vertical direction).

In addition, the laser beam LL is scanned for the same line located in the drawing area S11 in an odd frame and an even frame. In other words, the laser beam LL is scanned such that each drawing line L of an odd frame and each drawing line L of an even frame coincide with each other.

In particular, for example, as shown in FIGS. 4A and 4B, for the first frame (an odd frame), drawing is started from the upper left side, drawing is performed up to the lower right side in a zigzag pattern. In addition, for the second frame (an even frame), the turning direction of the movable plate 421a is set to be reversed, and drawing is performed from the lower right side to the upper left side, which is opposite to the above-described case of the first frame. Thereafter, similarly, for an odd frame, drawing is performed from the upper left side to the lower right side, and, for an even frame, drawing is performed from the lower right side to the upper left side.

In addition, in this embodiment, although the forward path of the scanning in the vertical direction is set to an odd frame, and the returning path of the scanning in the vertical direction is set to an even frame, the invention is not limited thereto. Thus, it may be configured such that the returning path of the scanning in the vertical direction is set to an odd frame, and the forward path of the scanning in the vertical direction is set to an even frame.

In addition, although the position at which drawing is started for the first frame is located on the upper left side, the invention is not limited thereto. Thus, the position at which drawing is started for the first frame may be located on the upper right side, the lower left side, the lower right side, or the like.

Furthermore, the laser beam LL may be scanned for different lines located in the drawing area S11 in an odd frame and an even frame.

Next, as a concrete example, the operation of the optical scanning-type projector 1 in a case where a moving picture is displayed by continuously displaying six images will be described. As shown in FIG. 7, the video data storing section 51 includes six memories, that is, a first memory 511, a second memory 512, a third memory 513, a fourth memory 514, a fifth memory 515, and a sixth memory 516. In these six memories 511 to 516, six images are stored in the order in which they are displayed. In other words, first, video data (hereinafter, referred to as "first video data") of an image displayed first is stored in the first memory 511, and video data (hereinafter, referred to as "second image data) of an image displayed second is stored in the second memory 512. Thereafter, similarly, video data (hereinafter, referred to as "third video data") of an image displayed third is stored in the third memory 513, video data (hereinafter, referred to as "fourth video data") of an image displayed fourth is stored in the fourth memory 514, video data (hereinafter, referred to as "fifth video data") of an image displayed fifth is stored in the fifth memory 515, and video data (hereinafter, referred to as "sixth video data") of an image displayed sixth is stored in the sixth memory 516, sequentially. In addition, the input rate of the video data for the video data storing section 51 is not particularly limited, and for example, is 60 Hz.

When input of the first video data to the first memory 511 is completed, the driving control unit takes out the first video data from the first memory 511, and, as described above, draws the first image corresponding to the first video data in the drawing area S11. In a case where the maximum widths of the first image in the vertical direction and the horizontal direction are relatively large, and the drawing rate at the time of drawing the image on the drawing area S11 is 30 Hz (in other words, it takes 1/30 seconds), at a time point when drawing of the image is completed, input of the second video data to the second memory 512 and the input of the third video data to the third memory 513 are completed.

Thereafter, the driving control unit 5 takes out the latest video data (that is, video data of an image that is displayed the latest) out of a plurality of sets of video data of which input to the video data storing section 51 is completed. In other words, the second video data input to the second memory 512 is thinned out, and the third video data input to the third memory 513 is taken out. Then, the driving control unit 5 draws the third image corresponding to the third video data that has been taken out in the drawing area S11. When the maximum width of the third image in the vertical and horizontal directions are relatively small, and the drawing rate at the time of drawing the image in the drawing area S11 is 80 Hz, at a time point when drawing of the image is completed, the input of the fourth video data to the fourth memory 514 has not been completed. In this case, the driving control unit 5 takes out the third video data (the latest video data from among a plurality of sets of video data of which input to the video data storing section 51 is completed) from the third memory 513 and draws the third image corresponding to the third video data in the drawing area S11. At a time point when the second drawing of the third image is completed, the input of the fourth video data to the fourth memory 514 is completed, and the fifth video data is in the middle of the process of being input to the fifth memory 515.

Thereafter, the driving control unit 5 takes out the fourth video data (the latest video data from among a plurality of sets of the video data of which input to the video data storing section 51 is completed) from the fourth memory 514 and draws the fourth image corresponding to the fourth video data in the drawing area S11. In a case where the drawing rate is 30 Hz when the fourth image is drawn on the drawing area S11, at a time point when the drawing of the image is completed, the input of the fifth video data to the fifth memory 515 and the input of the sixth video data to the sixth memory 516 are completed.

Thereafter, the driving control unit 5 thins out the fifth video data input to the fifth memory 515 and takes out the sixth video data input to the sixth memory 516. Then, the driving control unit 5 draws the sixth image corresponding to the sixth video data in the drawing area S11.

As above, a desired moving image is reproduced in the drawing area S11.

As above, according to the optical scanning-type projector 1, by changing the scanning range of the laser beam LL on the drawing area S11 at the time of displaying each image based on the shape and the size (the maximum width in the horizontal direction and the maximum width in the vertical direction) of each image, which is displayed on the drawing area S11, on the drawing area S11, the number of images (the refresh rate) displayed in the drawing area S11 per unit time is configured so as to be changed. Accordingly, for each image, a time interval required for drawing the image can be shortened, and the number of the images that can be drawn per unit time can be maximally increased (the refresh rate is maximally increased). As a result, for example, the variations in the image displayed in the drawing area S11 can be prevented, and a moving image can be smoothly reproduced, whereby superior display characteristics can be realized.

In particular, as described above, by drawing based on the latest data out of a plurality of sets of the video data stored in the video data storing section 51, the above-described advantages become prominent.

In the above-described example, although a configuration in which the video data storing section 51 has six memories has been described, the number of the memories is not particularly limited as long as it can perform the above-described operation. In addition, in the above-described example, although a moving picture that is formed by six images has been described, the moving image may be formed by seven or more images. In this case, the seventh image and images after that are overwritten in order from the first memory 511.

Next, modified examples will be described with reference to FIGS. 8A and 8B.

The optical scanning-type projector 1, as shown in FIGS. 8A and 8B, may be driven such that the swing width of the laser beam LL on the drawing area S11 in the horizontal direction is slightly larger than the maximum width of the image displayed on the drawing area S11 in the horizontal direction. The reason for this is that there is a case where the angular velocity (speed) of the light reflecting unit 411e of the optical scanner 41 at the left end portion and the right end portion of each drawing line L may easily decrease so as not to be appropriate for drawing.

Second Embodiment

Next, an image forming apparatus according to a second embodiment of the invention will be described.

Figure 9:
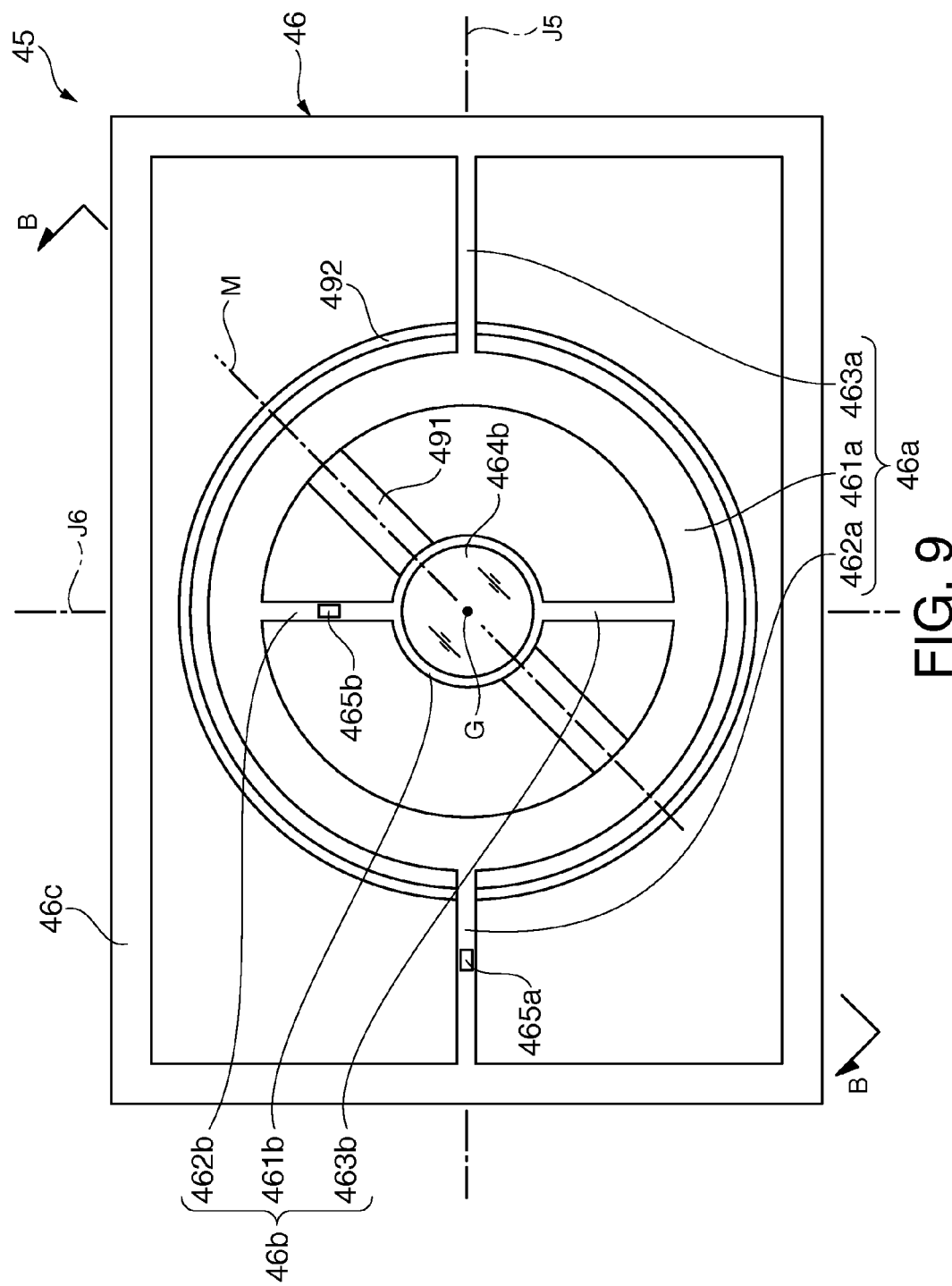
FIG. 9 is a schematic plan view showing an optical scanner included in an image forming apparatus according to a second embodiment of the invention.
Figure 10:
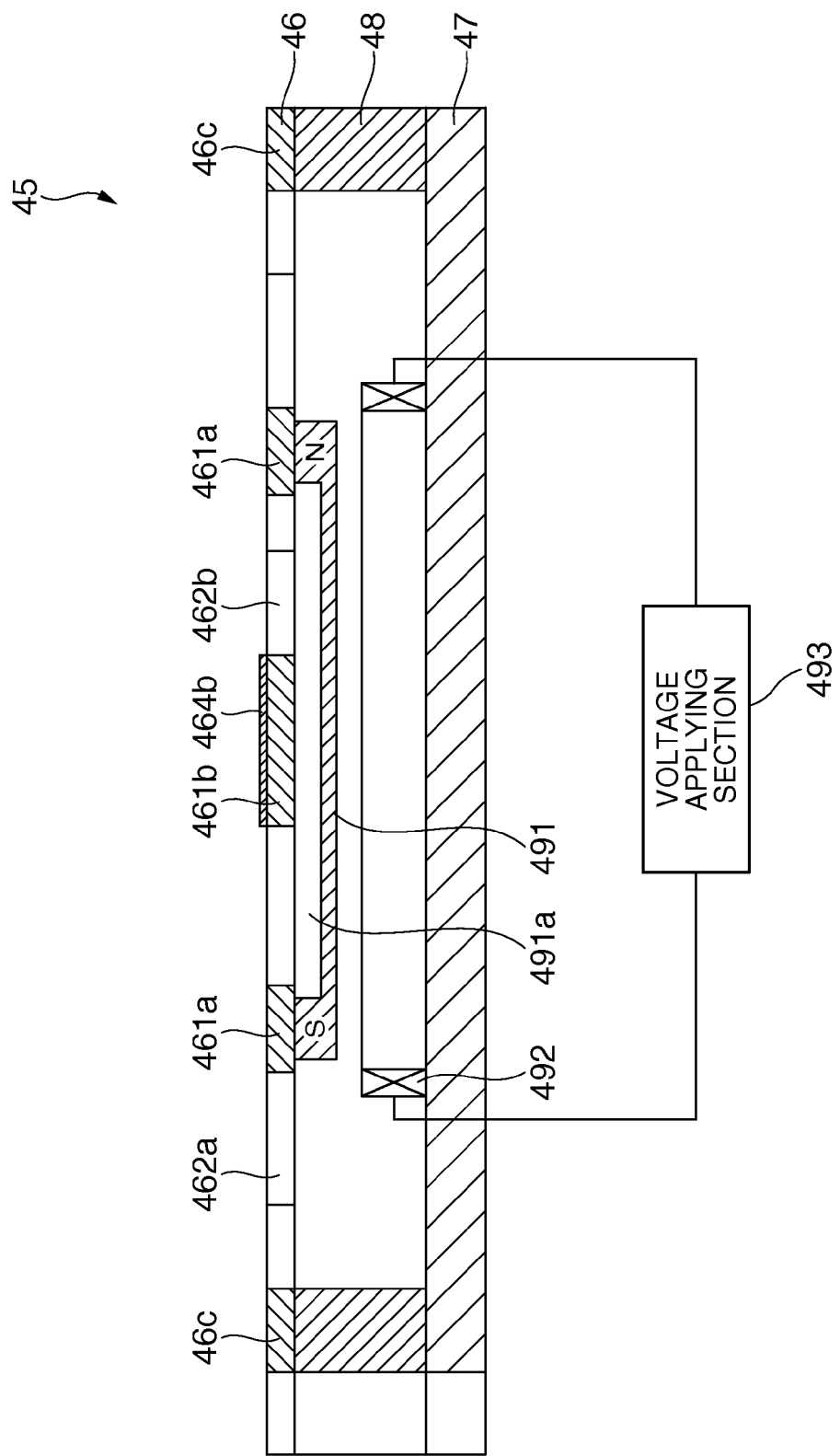
FIG. 10 is a cross-sectional view taken along line B-B shown in FIG. 9.
Figure 11:
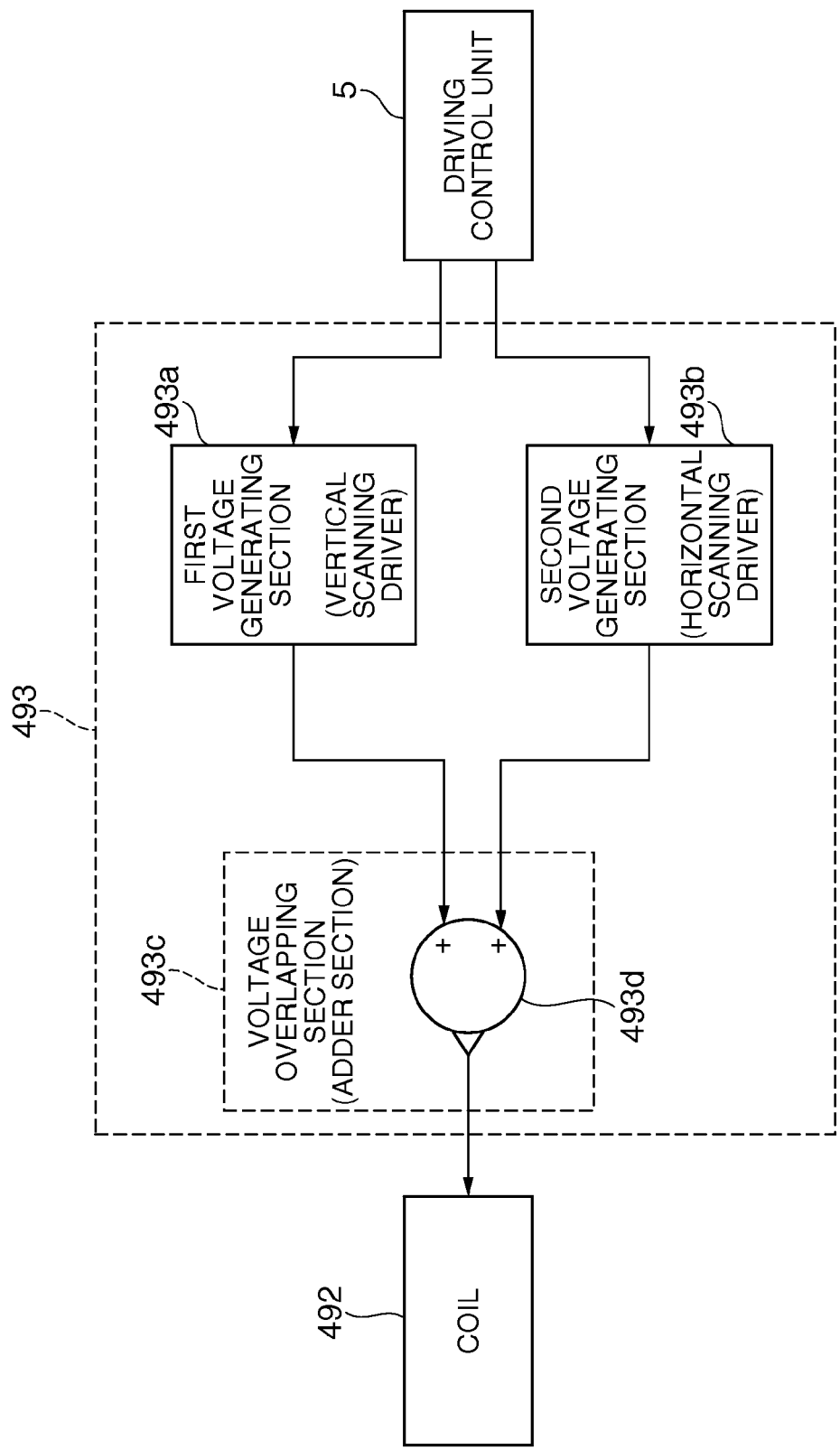
FIG. 11 is a block diagram showing a voltage applying section of a driving unit that is included in the optical scanner shown in FIG. 9.
Figure 12A:
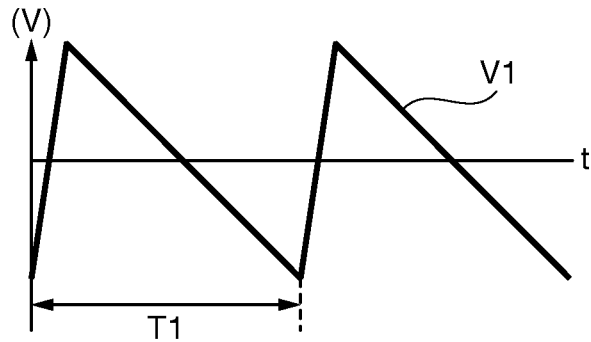
FIGS. 12A and 12B are diagrams showing examples of a voltage that is generated in a first voltage generating unit and a second voltage generating unit shown in FIG. 11.
Figure 12B:
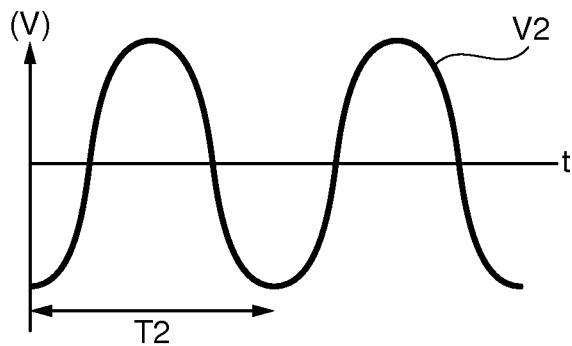
Figures 13A, 13B:
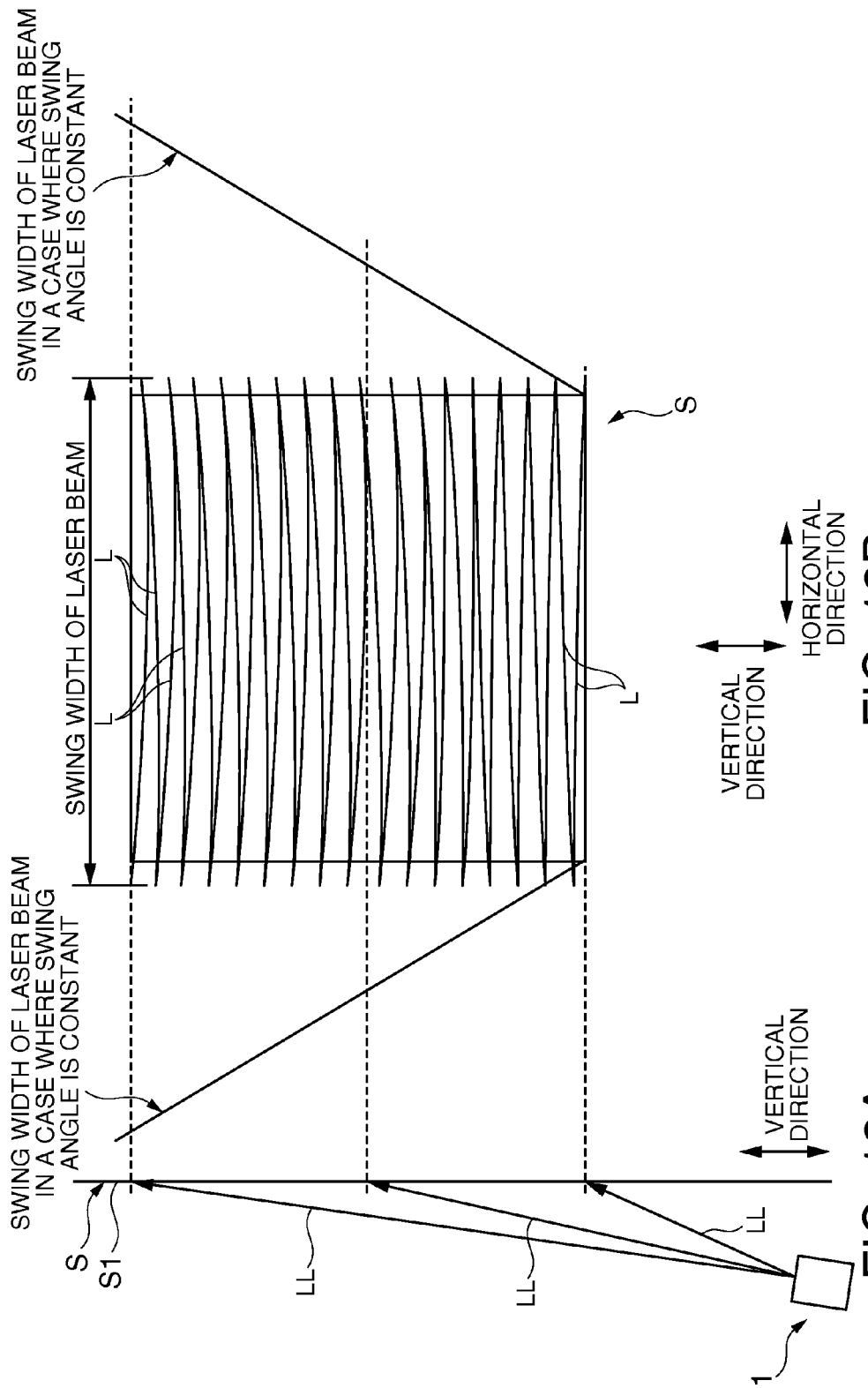
FIGS. 13A and 13B are diagrams illustrating the operation of the image forming apparatus shown in FIG. 9 (FIG. 13A is a side view, and FIG. 13B is a front view).

FIG. 9 is a schematic plan view showing an optical scanner included in an image forming apparatus according to a second embodiment of the invention. FIG. 10 is a cross-sectional view taken along line B-B shown in FIG. 9. FIG. 11 is a block diagram showing a voltage applying section of a driving unit that is included in the optical scanner shown in FIG. 9. FIGS. 12A and 12B are diagrams showing examples of a voltage that is generated in a first voltage generating unit and a second voltage generating unit shown in FIG. 11. FIGS. 13A and 13B are diagrams illustrating the operation of the image forming apparatus shown in FIG. 9 (FIG. 13A is a side view, and FIG. 13B is a front view). Hereinafter, for convenience of the description, the front side of the sheet, the inner side of the sheet, the right side, and the left side in FIG. 9 are referred to as "upper side", "lower side", "right side" and "left side". In addition, the upper side, the lower side, the right side, and the left side in FIG. 10 are referred to as the "upper side", the "lower side", the "right side", and the "left side".

Hereinafter, the image forming apparatus according to the second embodiment will be described focusing on differences between the above-described first embodiment and the second embodiment, and the description of similar configurations will be omitted.

The optical scanning-type projector according to the second embodiment (image forming apparatus) is almost the same as that of the first embodiment except that the configuration of the optical scanner included in the optical scanning unit is different and the trajectory of the horizontal scanning on the drawing area S11 is not linear. In FIGS. 12A, 12B, 13A, and 13B, the same reference numeral is assigned to the same configuration as that of the above-described embodiment.

The optical scanning unit 4 has an optical scanner 45 that is a so-called vibration system with two degrees of freedom.

The optical scanner 45 includes: a base body 46 that includes a first vibration system 46a, a second vibration system 46b, and a support portion 46c as shown in FIG. 9; an opposing substrate 47 that is arranged so as to face the base body 46; a spacer member 48 that is disposed between the base body 46 and the opposing substrate 47; a permanent magnet 491; and a coil 492.

The first vibration system 46a is configured by a frame-shaped driving unit 461a that is disposed on the inner side of the frame-shape support portion 46c and one pair of first connection portions 462a and 463a that support the driving unit 461a at the support portion 46c on both sides.

The second vibration system 46b is configured by a movable plate 461b that is disposed on the inner side of the driving unit 461a and one pair of second connection portions 462b and 463b that support the movable plate 461b at the driving unit 461a on both sides.

The driving unit 461a forms a circular shape in the plan view of FIG. 9. In addition, the shape of the driving unit 461a is not particularly limited as long as it forms a frame shape. Thus, for example, the driving unit 461a may form a square annular shape in the plan view of FIG. 9. A permanent magnet 491 is bonded to the lower face of the driving unit 461a.

The first connection portions 462a and 463a form a long shape and can be elastically transformed. The first connection portions 462a and 463a connect the driving unit 461a and the support portion 46c such that the driving unit 461a can be turned with respect to the support portion 46c. The first connection portions 462a and 463a are disposed along the same axis and are configured such that the driving unit 461a can be turned around the axis (hereinafter, referred to as a "turning center axis J5") as its center with respect to the support portion 46c.

In the first connection portion 462a, a piezoelectric device 465a that is used for detecting the angle (the turning angle around the turning center axis J5) (behavior) of the driving unit 461a is disposed.

The movable plate 461b forms a circular shape in the plan view of FIG. 9. The shape of the movable plate 461b is not particularly limited as long as it can be formed on the inner side of the driving unit 461a. For example, the movable plate 461b may form an oval shape or a rectangular shape in the plan view of FIG. 9. On the upper face of the movable plate 461b, a light reflecting unit 464b having light reflectivity is formed.

The second connection portions 462b and 463b form a long shape and can be elastically transformed. The second connection portions 462b and 463b connect the movable plate 461b and the driving unit 461a such that the movable plate 461b can be turned with respect to the driving unit 461a. The second connection portions 462b and 463b are disposed along the same axis and are configured such that the movable plate 461b can be turned around the axis (hereinafter, referred to as a "turning center axis J6") as its center with respect to the driving unit 461a.

In the second connection portion 462b, a piezoelectric device 465b that is used for detecting the angle (the turning angle around the turning center axis J6) (behavior) of the movable plate 461b is disposed.

As shown in FIG. 9, the turning center axis J5 and the turning center axis J6 are orthogonal to each other. In addition, the center of the driving unit 461a and the movable plate 461b is located at an intersection of the turning center axis J5 and the turning center axis J6 in the plan view of FIG. 9. Hereinafter, for convenience of the description, the intersection of the turning center axis J5 and the turning center axis J6 is also referred to as an "intersection G".

As shown in FIG. 10, the base body 46 as described above is bonded to the opposing substrate 47 through the spacer member 48. On the upper face of the opposing substrate 47, a coil 492 that generates a magnetic field acting on the permanent magnet 491 is disposed.

The permanent magnet 491 is disposed along a segment (this segment may be referred to as a "segment M") that is tilted with respect to each of the turning center axis J5 and the turning center axis J6 through the intersection G in the plan view of FIG. 9. One side of the permanent magnet 491 in the longitudinal direction with respect to the intersection G is the S pole, and the other side thereof is the N pole. In FIG. 10, the left side of the permanent magnet 491 in the longitudinal direction is the S pole, and the right side thereof is the N pole.

In the plan view of FIG. 9, the tilt angle θ of the segment M with respect to the turning center axis J5 is preferably in the range of 30 to 60 degrees, is more preferably in the range of 40 to 50 degrees, and is still more preferably about 45 degrees. By disposing the permanent magnet 491 as above, the movable plate 461b can be smoothly turned around the turning center axis J5 and the turning center axis J6. In this embodiment, the segment M is tilted by about 45 degrees with respect to the turning center axis J5 and the turning center axis J6.

As shown in FIG. 10, a concave portion 491a of which the upper face is opened is formed in the permanent magnet 491. This concave portion 491a is a clearance portion that is used for preventing a contact between the permanent magnet 491 and the movable plate 461b. By forming such a concave portion 491a, the movable plate 461b is prevented from being brought into contact with the permanent magnet 491 when being turned around the turning center axis J5.

The coil 492 is formed so as to surround the outer circumference of the driving unit 461a in the plan view of FIG. 9. Accordingly, the driving unit 461a and the coil 492 can be reliably prevented from being in contact with each other when the optical scanner 45 is driven. As a result, the separation distance between the coil 492 and the permanent magnet 491 can be formed to be relatively short, and accordingly, the magnetic field generating from the coil 492 can be effectively acted on the permanent magnet 491.

The coil 492 is electrically connected to a voltage applying unit 493. Thus, when a voltage is applied to the coil 492 by the voltage applying unit 493, magnetic fields in the directions that are orthogonal to the turning center axis J5 and the turning center axis J6 are generated from the coil 492.

As shown in FIG. 11, the voltage applying unit 493 includes: a first voltage generating unit 493a that generates a first voltage V1 used for turning the movable plate 461b around the turning center axis J5; a second voltage generating unit 493b that generates a second voltage V2 used for turning the movable plate 461b around the turning center axis J6; and a voltage overlapping unit 493c that overlaps the first voltage V1 and the second voltage V2 and applies a resultant voltage to the coil 492.

The first voltage generating unit 493a, as shown in FIG. 12A, generates a first voltage V1 (a voltage for vertical scanning) that periodically changes with a period T1 that is a multiple of the frame frequency.

The first voltage V1 forms a waveform like a triangle wave. Accordingly, the optical scanner 45 can effectively perform vertical scanning (sub scanning) in a reciprocal manner. Here, the waveform of the first voltage V1 is not limited thereto. Here, although the frequency (1/T1) of the first voltage V1 is not particularly limited as long as it is appropriate for vertical scanning, it is preferable that the frequency of the first voltage V1 is in the range of 15 to 40 Hz (about 30 Hz).

In this embodiment, the frequency of the first voltage V1 is adjusted so as to be different from the torsional resonance frequency of the first vibration system 46a that is configured by the driving unit 461a and one pair of the first connection portions 462a and 463a.

On the other hand, the second voltage generating unit 493b, as shown in FIG. 12B, generates a second voltage V2 (horizontal scanning voltage) that periodically changes with a period T2 that is different from the period T1.

The second voltage V2 forms a waveform that is the same as a sinusoidal wave. Accordingly, the optical scanner can effectively performs primary scanning the light. However, the waveform of the second voltage V2 is not limited thereto.

In addition, the frequency of the second voltage V2 is not particularly limited as long as it is higher than the frequency of the first voltage V1 and is appropriate for horizontal scanning. The frequency of the second voltage V2 is preferably in the range of 10 to 40 kHz. As above, by setting the frequency of the second voltage V2 to be in the range of 10 to 40 kHz and setting the frequency of the first voltage V1 to about 30 Hz as described above, the movable plate 461b can be turned around the turning center axis J5 and the turning center axis J6 at a frequency that is appropriate for drawing on a screen. Furthermore, a combination of the frequency of the first voltage V1 and the frequency of the second voltage V2 is not particularly limited as long as they can allow the movable plate 461b to be turned around the turning center axis J4 and the turning center axis J6.

In this embodiment, the frequency of the second voltage V2 is adjusted so as to be the same as the torsional resonance frequency of the second vibration system 46b that is configured by the movable plate 461b and one pair of the second connection portions 462b and 463b. Accordingly, the turning angle of the movable plate 461b around the turning center axis J3 can be set to be large.

In addition, when it is assumed that the resonance frequency of the first vibration system 46a is $f_1$ [Hz], and the frequency of the second vibration system 46b is $f_2$ [Hz], $f_1$ and $f_2$ preferably satisfy the relationship of "$f_2 > f_1$" and more preferably satisfies the relationship of $f_2 \geq 10 \cdot f_1$. In such a case, the movable plate 461b can be turned around the turning center axis J4 more smoothly at the frequency of the second voltage V2 while turning the movable plate 461b around the turning center axis J3 at the frequency of the first voltage V1.

The first voltage generating unit 493a and the second voltage generating unit 493b are connected to the driving control unit 5 and are driven in accordance with a signal transmitted from the driving control unit 5. The voltage overlapping unit 493c is connected to the first voltage generating unit 493a and the second voltage generating unit 493b.

The voltage overlapping unit 493c includes an adder 493d that is used for applying a voltage to the coil 492. The adder 493d receives the first voltage V1 from the first voltage generating unit 493a and receives the second voltage V2 from the second voltage generating unit 493b, overlaps the first and second voltages, and applies a resultant voltage to the coil 492.

The optical scanner 45 having the above-described configuration is driven as below.

For example, the first voltage V1 as shown in FIG. 12A and the second voltage V2 as shown in FIG. 12B overlap each other by the voltage overlapping unit 493c, and the overlapped voltage is applied to the coil 492 (this overlapped voltage is also referred to as a "voltage V3").

Then, switching between a magnetic field that attracts the S pole side of the permanent magnet 491 to the coil 492 and repulses the N pole side from the coil 492 and a magnetic field that repulses the S pole side of the permanent magnet 491 from the coil 492 and attracts the N pole side to the coil 492 is performed in accordance with a voltage corresponding to the first voltage V1 included in the voltage V3. Accordingly, while the first connection portions 462a and 463a are torsionally transformed, the driving unit 461a is turned around the turning center axis J5 at the frequency of the first voltage V1 together with the movable plate 461b.

In addition, the frequency of the first voltage V1 is set to be extremely lower than the frequency of the second voltage V2, and the resonance frequency of the first vibration system 46a is designed to be lower than that of the second vibration system 46b. Accordingly, the first vibration system 46a can be vibrated more easily than the second vibration system 46b, and the movable plate 461b is prevented from being turned around the turning center axis J6 in accordance with the first voltage V1.

Then, switching between a magnetic field that attracts the S pole side of the permanent magnet 491 to the coil 492 and repulses the N pole side from the coil 492 and a magnetic field that repulses the S pole side of the permanent magnet 491 from the coil 492 and attracts the N pole side to the coil 492 is performed in accordance with a voltage corresponding to the second voltage V2 included in the voltage V3. Accordingly, while the second connection portions 462b and 463b are torsionally transformed, the movable plate 461b is turned around the turning center axis J6 at the frequency of the second voltage V2.

In addition, since the frequency of the second voltage V2 is the same as the torsional resonance frequency of the second vibration system 46b, the movable plate 461b can be dominantly turned around the turning center axis J6 in accordance with the second voltage V2. Accordingly, the movable plate 461b is prevented from being turned around the turning center axis J5 together with the driving unit 461a in accordance with the second voltage V2.

According to the above-described optical scanner 45, the laser beams (light) can be scanned two dimensionally by one actuator 2. Therefore, the space of the optical scanning unit 4 can be saved. In addition, for example, when one pair of optical scanners is used, as in the first embodiment, the relative positional relationship thereof needs to be set with high precision. However, the relative positional relationship does not need to be set in this embodiment, and accordingly, the manufacturing process can be performed in an easy manner.

In addition, according to this embodiment, differently from the first embodiment shown in FIGS. 4A and 4B, as shown in FIGS. 13A and 13B, a plurality of drawing lines L that is the trajectory of the laser beam LL on the drawing area S11 when the laser beam LL is two-dimensionally scanned for the drawing area S11 in the light emitting state in which the laser beam (light) LL is emitted from the light source unit 3, is disposed in a zigzag pattern in a distorted manner.

In addition, the drawing line L is distorted, and thus, while calculating data corresponding to the pixel data to be drawn on a line to be scanned from now, the video data calculating section 52 reads out data from the video data storing section 51, performs various correction calculation operations and the like based on the drawing timing information input from the drawing timing generating section 53, and then transmits the luminance data of each color to the light source modulating section 54.

Processes other than the above-described processes are the same as those of the first embodiment.

An optical scanning unit that is included in a vector scan module has an optical scanner having the same configuration as that of the optical scanner 45. However, the optical scanner included in the vector scan module drives the first vibration system and the second vibration system in a non-resonant state.

According to such a second embodiment, the same advantages as those of the first embodiment can be acquired.

As above, although the image forming apparatus according to the embodiments of the invention have been described, the invention is not limited thereto. Thus, the configuration of each unit can be replaced with any arbitrary configuration having the same function. In addition, any arbitrary constituent member may be added to an embodiment of the invention. Furthermore, the invention may be implemented by combining two or more arbitrary configurations (characteristics) included in the above-described embodiments.

In addition, in the above-described embodiments, although a form has been described in which an image is drawn in the drawing area formed on the display surface of the screen, the invention is not limited thereto, and an image may be directly drawn, for example, on a wall face, a face on the floor, or the like.

Furthermore, in the first embodiment, although a form has been described in which the optical scanning unit has one pair of optical scanners, the invention is not limited thereto as long as the laser beam can be scanned. Thus, for example, an optical scanner and a galvanometer mirror may be used. In such a case, it is preferable that the galvanometer mirror is used for vertical scanning.

In addition, in the above-described first embodiment, although a form has been described in which the laser beam is scanned in the vertical direction in a reciprocal manner, the invention is not limited thereto. Thus, the laser beam may be scanned in any one direction of the vertical directions.

Furthermore, in the above-described embodiment, one laser beam (light) is emitted by combining a red laser beam, a green laser beam, and a blue laser beam by using three dichroic mirrors. However, the beams may be combined by using a dichroic prism or the like.

In the above-described embodiment, although a configuration has been described in which the light source unit includes a laser beam source emitting red laser beams, a laser beam source emitting blue laser beams, and a laser beam source emitting green laser beams, the invention is not limited thereto. For example, the light source unit may include a laser beam source emitting red laser beams, a laser beam source emitting blue laser beams, and a laser beam source emitting ultraviolet laser beams. In such a case, since the ultraviolet laser beams are emitted, a fluorescent substance that generates green fluorescence is contained within the screen. Therefore, a full-color image can be displayed in the drawing area.

The entire disclosure of Japanese Patent Application No. 2010-117044, filed May 21, 2010 is expressly incorporated by reference herein.

What is claimed is:

1. An image forming apparatus that is configured so as to continuously display a plurality of images in a drawing area by scanning light for the drawing area formed on a display surface, the image forming apparatus comprising:
   a light emitting unit that emits the light;
   an optical scanning unit that two-dimensionally scans the light emitted from the light emitting unit for the drawing area by scanning the light in a first direction and scanning the light in a second direction that is orthogonal to the first direction; and
   a driving control unit that controls driving of the optical scanning unit such that the number of the images displayed in the drawing area in a unit of time is changed by changing a range in which the light is scanned on the drawing area at the time of displaying the images based on a shape and a size of each of the images, which are displayed in the drawing area, on the drawing area, wherein a number of images displayed is increased when the sizes of the images are small; and a gap of the scanned light in the second direction is constant.

2. The image forming apparatus according to claim 1, further comprising a storage unit that stores image data of the plurality of images in the order in which the image data is displayed, wherein the driving control unit controls the driving of the optical scanning unit based on latest image data out of a plurality of sets of image data stored in the storage unit.

3. The image forming apparatus according to claim 1, wherein the driving control unit drives the optical scanning unit by allowing a swing width of the scanning on the drawing area in the second direction to be in correspondence with a maximum width of the images, which are displayed in the drawing area, on the drawing area in the second direction.

4. The image forming apparatus according to claim 3, wherein the driving control unit controls the driving of the optical scanning unit such that the swing width of the scanning on the drawing area in the second direction is the same as the maximum width of the images, which are displayed in the drawing area, on the drawing area in the second direction.

5. The image forming apparatus according to claim 3, wherein the driving control unit includes a second-direction maximum width detecting section that detects the maximum width of the images, which are displayed in the drawing area, on the drawing area in the second direction.

6. The image forming apparatus according to claim 3, wherein image data of each of the images displayed in the drawing area includes data relating to a maximum width on the drawing area in the second direction, and wherein the driving control unit controls the swing width of the scanning in the second direction based on the data.

7. The image forming apparatus according to claim 1, wherein the driving control unit drives the optical scanning unit by allowing a swing width of the scanning on the drawing area in the first direction to be in correspondence with the maximum width of the images, which are displayed in the drawing area, on the drawing area in the first direction.

8. The image forming apparatus according to claim 7, wherein the driving control unit controls the driving of the optical scanning unit such that the swing width of the scanning on the drawing area in the first direction is the same as the maximum width of the images, which are displayed in the drawing area, on the drawing area in the first direction.

9. The image forming apparatus according to claim 7, wherein the driving control unit includes a first-direction maximum width detecting section that detects the maximum width of the images, which are displayed in the drawing area, on the drawing area in the first direction.

10. The image forming apparatus according to claim 7, wherein image data of the images displayed in the drawing area includes data relating to the maximum width on the drawing area in the first direction, and wherein the driving control unit controls the swing width of the scanning in the first direction based on the data.

11. The image forming apparatus according to claim 1, wherein the optical scanning unit includes an optical scanner, in which a movable plate having a light reflecting unit reflecting the light emitted from the light emitting unit is disposed so as to be turnable in at least one direction or two orthogonal directions, scanning the light reflected by the light reflecting unit for the drawing area in accordance with the turning.

12. The image forming apparatus according to claim 1, wherein the driving control unit has a function for correcting distortion of the images displayed in the drawing area.

13. An image forming apparatus that is configured so as to continuously display a plurality of images by scanning light, the image forming apparatus comprising:

a light emitting unit that emits the light;

an optical scanning unit that two-dimensionally scans the light emitted from the light emitting unit by scanning the light in a first direction and scanning the light in a second direction that is orthogonal to the first direction; and a driving control unit that controls driving of the optical scanning unit such that the number of the images displayed in a unit of time is changed by changing a range in which the light is scanned at the time of displaying the images based on a shape and a size of each of the displayed images, wherein a number of images displayed is increased when the sizes of the images are small; and a gap of the scanned light in the second direction is constant.

14. The image forming apparatus of claim 13, wherein an output level of light output by the light emitting unit is lowered when the number of images that is drawn per unit time is increased.

15. The image forming apparatus of claim 1, wherein an output level of light output by the light emitting unit is lowered when the number of images that is drawn per unit time is increased.

* * * * *